(12) United States Patent
Ahn et al.

(10) Patent No.: US 12,090,847 B2
(45) Date of Patent: Sep. 17, 2024

(54) APPARATUS AND METHOD FOR CONTROLLING DISPLAY

(71) Applicant: HYUNDAI MOBIS Co., Ltd., Seoul (KR)

(72) Inventors: Sung Joon Ahn, Seongnam-si (KR);
Tae Hun Kim, Seongnam-si (KR);
Seung Hwan Lee, Hwaseong-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 444 days.

(21) Appl. No.: 17/381,555

(22) Filed: Jul. 21, 2021

(65) Prior Publication Data

US 2022/0024313 A1 Jan. 27, 2022

(30) Foreign Application Priority Data

Jul. 22, 2020 (KR) .................. 10-2020-0091141
Jul. 27, 2020 (KR) .................. 10-2020-0093399

(51) Int. Cl.
| | |
|---|---|
| *B60K 35/00* | (2024.01) |
| *B60K 35/10* | (2024.01) |
| *B60K 35/28* | (2024.01) |
| *B60K 35/60* | (2024.01) |
| *B60K 35/65* | (2024.01) |
| *B60K 35/80* | (2024.01) |

(52) U.S. Cl.
CPC .............. *B60K 35/00* (2013.01); *B60K 35/10* (2024.01); *B60K 35/28* (2024.01); *B60K 35/60* (2024.01); *B60K 35/658* (2024.01); *B60K 35/80* (2024.01); *B60K 2360/139* (2024.01); *B60K 2360/166* (2024.01); *B60K 2360/175* (2024.01); *B60K 2360/573* (2024.01); *B60K 2360/785* (2024.01)

(58) Field of Classification Search
None
See application file for complete search history.

(56) References Cited

U.S. PATENT DOCUMENTS

| | | | | |
|---|---|---|---|---|
| 2003/0078714 | A1* | 4/2003 | Kitano | B62D 1/04 701/41 |
| 2003/0128103 | A1* | 7/2003 | Fitzpatrick | B60K 35/00 345/1.3 |
| 2005/0283288 | A1* | 12/2005 | Howell | B62D 1/18 701/41 |
| 2016/0335038 | A1* | 11/2016 | Choi | B60K 35/10 |
| 2017/0212633 | A1* | 7/2017 | You | G06F 3/0412 |
| 2019/0111785 | A1* | 4/2019 | Ory | B60K 37/02 |
| 2020/0298900 | A1* | 9/2020 | Palm | B62D 1/18 |

FOREIGN PATENT DOCUMENTS

JP 2014026413 A * 2/2014

OTHER PUBLICATIONS

Machine translation of JP-2014026413-A (Year: 2014).*

* cited by examiner

*Primary Examiner* — Amelia Vorce
*Assistant Examiner* — Kyle S Park
(74) *Attorney, Agent, or Firm* — NSIP Law

(57) ABSTRACT

An apparatus with display control includes: an input part configured to receive position information of an in-vehicle device; a memory in which a program that implements display position control according to the position information is stored; and a processor configured to adjust a display position of information displayed on a display in a vehicle, according to the position information, by executing the program.

9 Claims, 30 Drawing Sheets

APPARATUS AND METHOD FOR CONTROLLING DISPLAY

CROSS-REFERENCE TO RELATED APPLICATIONS

This application claims the benefit under 35 U.S.C. § 119(a) of Korean Patent Application Nos. 10-2020-0091141 and 10-2020-0093399, filed on Jul. 22, 2020 and Jul. 27, 2020, respectively, in the Korean Intellectual Property Office, the entire disclosures of which are incorporated herein by reference for all purposes.

BACKGROUND

1. Field of the Invention

The present invention relates to a display control apparatus and a display control method.

2. Discussion of Related Art

According to the related art, with the development of a vehicle type, an in-vehicle display tends to be gradually enlarged, and a technology for using an entire region including a display, a windshield, and a window as a display is being developed.

However, in relation to setting positions of content to be displayed on various screens and enlarged displays, a method of transmitting clearer information to passengers is required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus with display control includes: an input part configured to receive position information of an in-vehicle device; a memory in which a program that implements display position control according to the position information is stored; and a processor configured to adjust a display position of information displayed on a display in a vehicle, according to the position information, by executing the program.

The information displayed on the display may include cluster information. The processor may be further configured to adjust a display position where the cluster information is displayed, according to positional movement of a steering wheel and a portable terminal mounted on the steering wheel, by executing the program.

The information displayed on the display may include content information displayed in conjunction with a portable terminal. The processor may be further configured to adjust a display position of the content information according to positional movement of the portable terminal, by executing the program.

The processor may be further configured to set the display position of the content information in a region other than a display region where navigation information is displayed, in response to a position of the portable terminal being moved to a position corresponding to the display region where the navigation information is displayed, in a case in which the display region where the navigation information is displayed is fixed, by executing the program.

The information displayed on the display may include content information displayed in conjunction with a portable terminal mounted on a steering wheel. The processor may be further configured to adjust a display position of the content information according to positional movement of the steering wheel and the portable terminal during autonomous driving, by executing the program.

In another general aspect, a method of display control includes: receiving position information about a position of an in-vehicle device; controlling a display position of information displayed on a display in a vehicle according to the position information of the in-vehicle device; and adjusting the display position of the information displayed on the display, according to a result of monitoring the position of the in-vehicle device.

The controlling of the display position of the information displayed on the display may include controlling a display position where cluster information is displayed, according to positional movement of a steering wheel and a portable terminal mounted on the steering wheel.

The controlling of the display position of the information displayed on the display may include controlling a display position of content information displayed in conjunction with a portable terminal, according to positional movement of the portable terminal.

The adjusting of the display position of the information displayed on the display may include adjusting the display position of the content information to a region other than a display region where navigation information is displayed, in response to a position of the portable terminal being moved to a position corresponding to the display region where the navigation information is displayed, in a case in which the display region where the navigation information is displayed is fixed.

The adjusting of the display position of the information displayed on the display may include adjusting a display position of content information displayed in conjunction with a portable terminal mounted on a steering wheel, according to positional movement of the steering wheel and the portable terminal during autonomous driving.

In another general aspect, a non-transitory, computer-readable storage medium stores instructions that, when executed by a processor, cause the processor to perform the method described above.

Other features and aspects will be apparent from the following detailed description, the drawings, and the claims.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

The above-described purposes of the present invention, other purposes, advantages and features of the present invention, and a method of achieving them will be apparent with reference to embodiments which are described later in detail in conjunction with the accompanying drawings.

However, the present invention is not limited to the embodiments which will be described below and may be implemented in different forms. The embodiments are only provided to easily convey the purposes, components, and effects of the present invention to those skilled in the art, and the present invention is defined by the disclosed claims.

Meanwhile, terms used in the description are provided not to limit the present invention but to describe the embodiments. In the embodiments, the singular form is intended to also include the plural form unless the context clearly indicates otherwise. The terms 'comprise' and/or 'comprising' as used herein do not preclude the presence or addition of at least one other component, step, operation, and/or element other than the stated components, steps, operations and/or elements.

Figure 1:
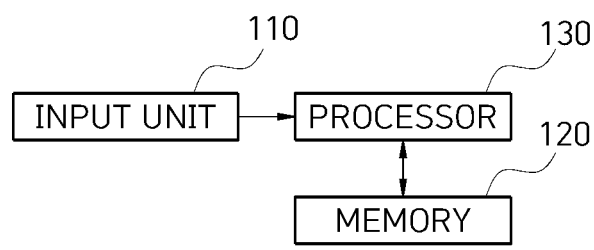
FIG. 1 illustrates an apparatus for controlling a display according to an embodiment of the present invention.

FIG. 1 illustrates an apparatus for controlling a display according to an embodiment of the present invention.

The apparatus for controlling a display according to the present invention includes an input part 110 which receives position information of an in-vehicle device, a memory 120 in which a program which controls a display position according to the position information is stored, and a processor 130 which executes the program, and the processor 130 adjusts the display position of the information displayed on the display in the vehicle according to the position information.

The processor 130 adjusts a display position where cluster information is displayed according to positional movement of a steering wheel and a portable terminal mounted on the steering wheel.

The processor 130 adjusts a display position of content information displayed in conjunction with the portable terminal according to positional movement of the portable terminal.

In the case in which a display region where navigation information is displayed is fixed, the processor 130 sets the display position of the content information in a region other than the display region where the navigation information is displayed when the position of the portable terminal is moved to a position corresponding to the display region where the navigation information is displayed.

The processor 130 adjusts the display position of the content information displayed in conjunction with the portable terminal according to positional movement of the steering wheel and the portable terminal mounted on the steering wheel during autonomous driving.

Figure 2A:
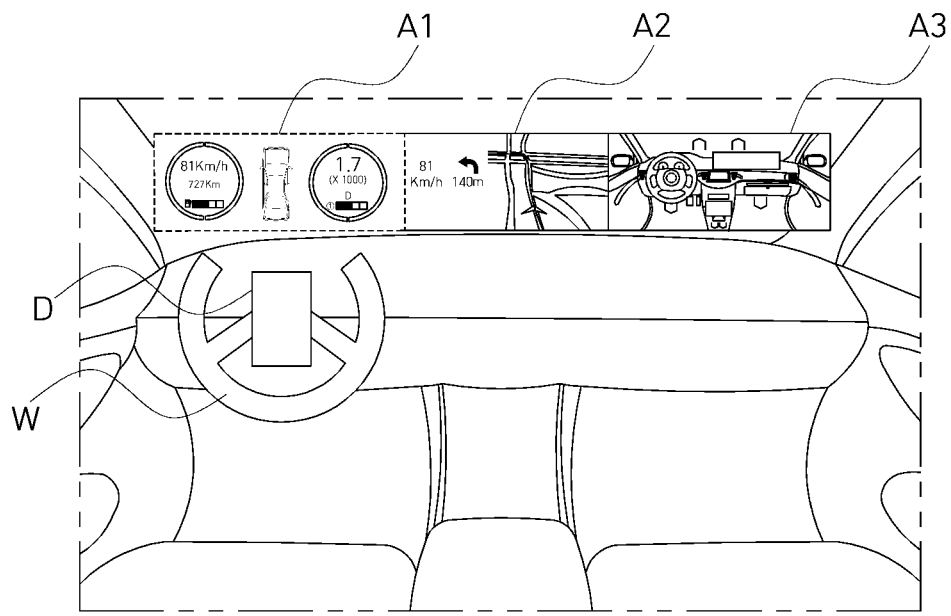
FIGS. 2A to 2C illustrate a display information change according to mounting positions of a steering wheel and a portable terminal according to the embodiment of the present invention.
Figure 2B:
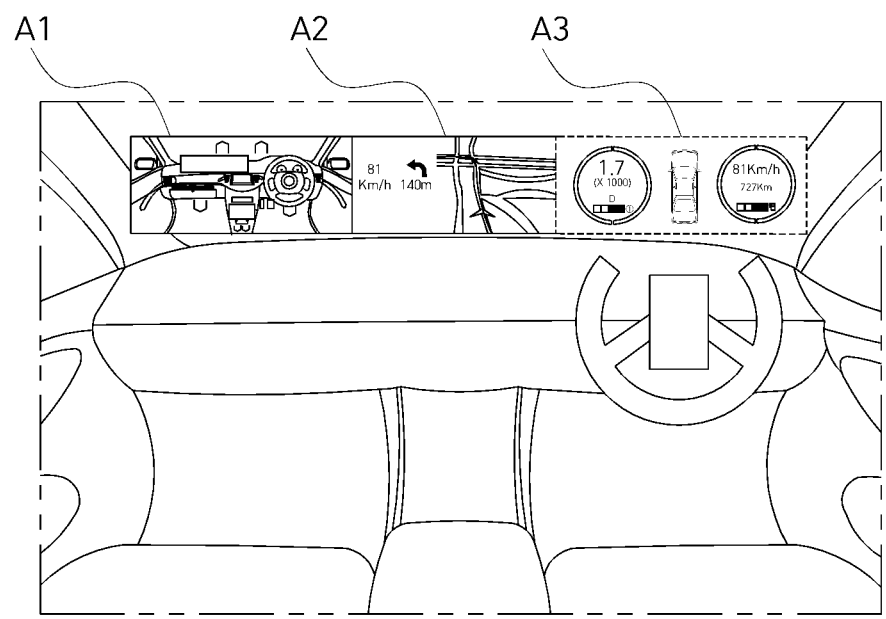
Figure 2C:
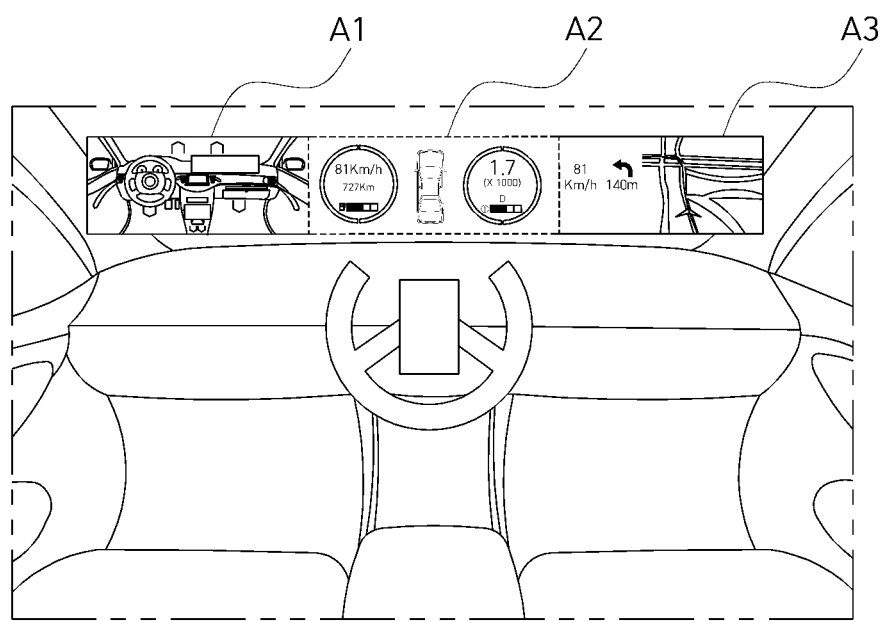

FIGS. 2A to 2C illustrate a display information change according to mounting positions of the steering wheel and the portable terminal according to the embodiment of the present invention.

Referring to FIGS. 2A to 2C, a portable terminal D is mounted on a steering wheel W, and a front display is partitioned into a first region A1, a second region A2, and a third region A3.

For example, in FIG. 2A, since the steering wheel W and the portable terminal D are located at a driver's seat, the first region A1 of a front display region displays the cluster information, the second region A2 displays the navigation information, and the third region A3 displays in-vehicle function (for example, an air conditioner function) information.

As shown in FIG. 2B, since the steering wheel W and the portable terminal D are moved to a passenger seat side, the third region A3 displays the cluster information, the first region A1 displays the in-vehicle function information, and the second region A2 displays the navigation information.

When driving control rights from a user sitting on the driver's seat are transferred to a user sitting on the passenger seat, the steering wheel W and the portable terminal D may be moved to a passenger seat position.

As shown in FIG. 2C, as the steering wheel W and the portable terminal D are moved to a center region, the second region A2 displays the cluster information, the first region A1 displays the in-vehicle function information, and the third region A3 displays the navigation information.

When seats in the vehicle are bench-type seats, a degree of freedom for seating positions is secured, and in the case of a steer-by-wire method, a degree of freedom for the position of the steering wheel is secured.

Further, before moving to the passenger seat position, the portable terminal of the user sitting on the driver's seat is separated from the steering wheel W, and after the steering wheel (W) is moved to the passenger seat position, the portable terminal of the user sitting on the passenger seat may be mounted on the steering wheel W.

Figure 3A:
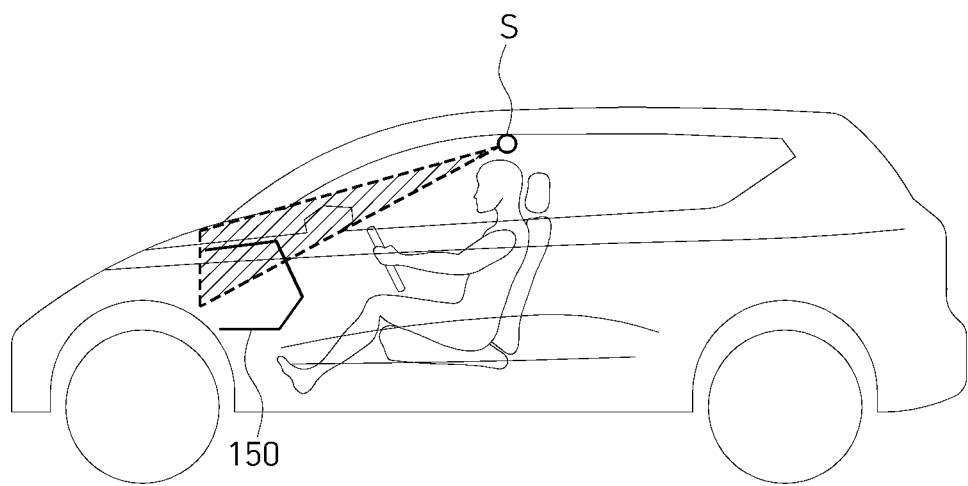
FIGS. 3A to 3C illustrate positional determination of an in-vehicle object according to the embodiment of the present invention.
Figure 3A:
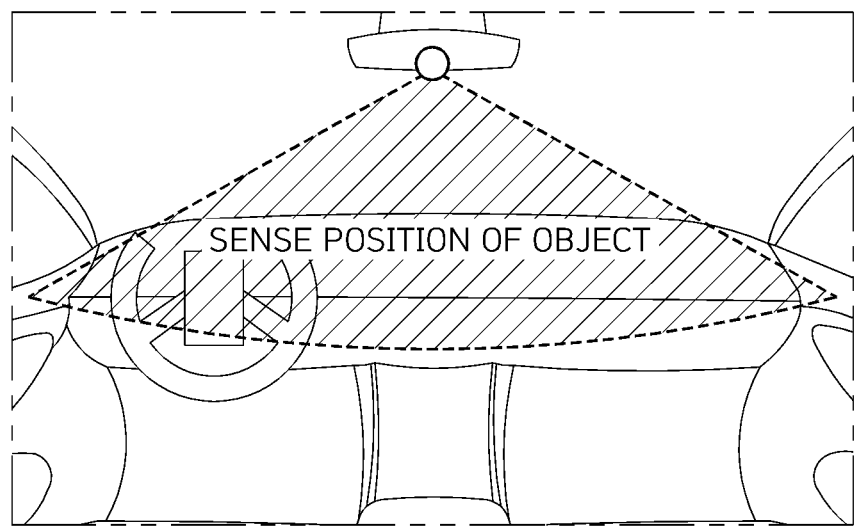
Figure 3B:
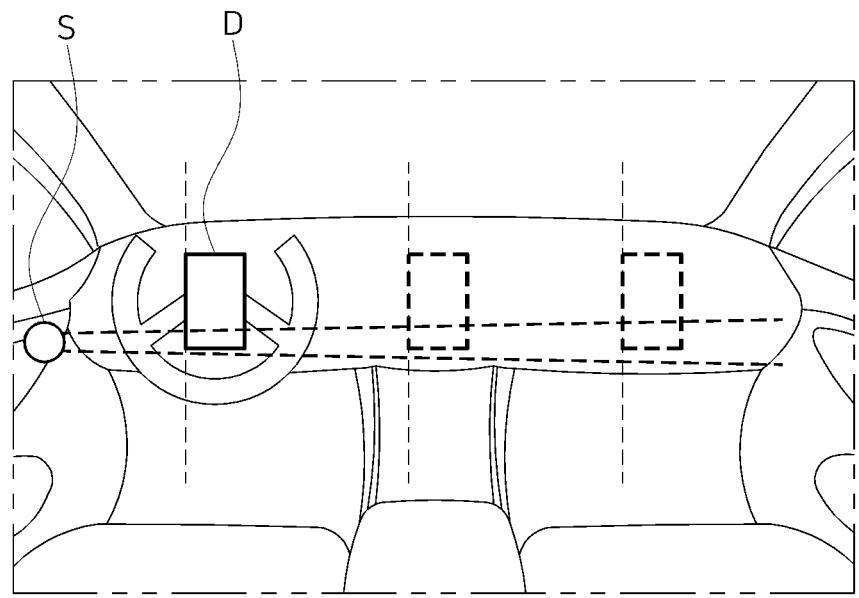
Figure 3C:
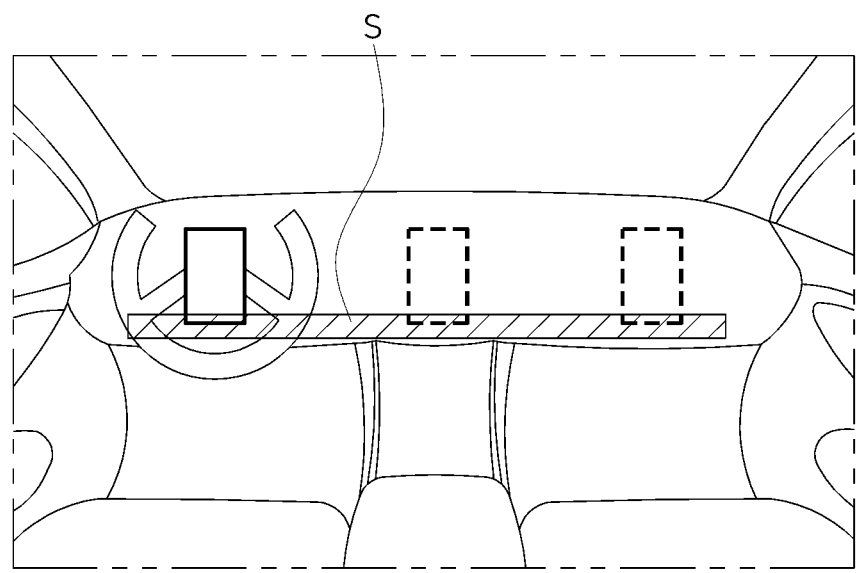

FIGS. 3A to 3C illustrate positional determination of an in-vehicle object according to the embodiment of the present invention.

A camera/sensor S is disposed near a rearview mirror as shown in FIG. 3A or is disposed in other regions to obtain position information of the in-vehicle object as shown in FIG. 3B.

As shown in FIG. 3B, the camera/sensor S may obtain position information of the portable terminal by recognizing a distance to the portable terminal, and an ultra-wideband (UWB) technology may be applied to check this position information.

As shown in FIG. 3C, it is possible to check a mounting position of the portable terminal using a wide sensor or switch S.

Figure 4A:
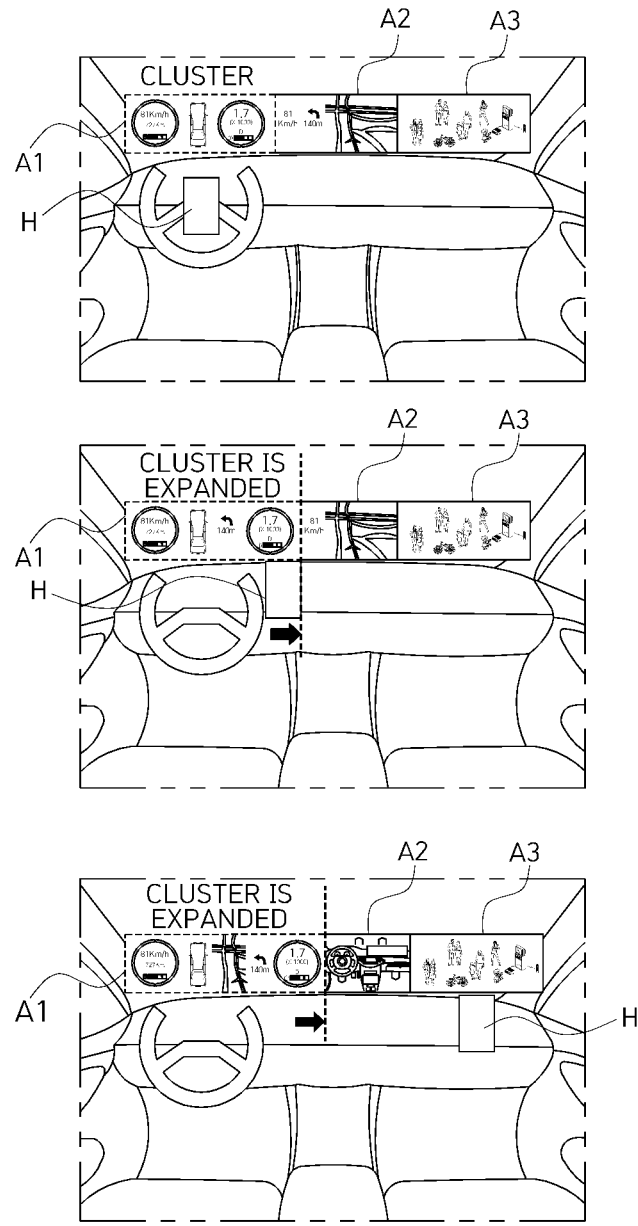
FIGS. 4A and 4B illustrate movement and expansion of the left and right areas of the display according to the embodiment of the present invention.
Figure 4B:
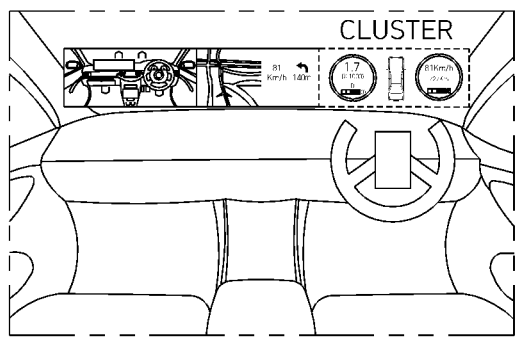
Figure 4B:
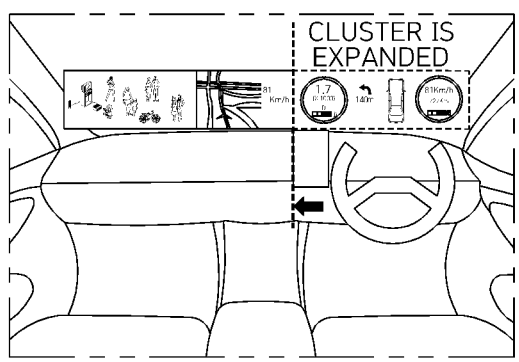
Figure 4B:
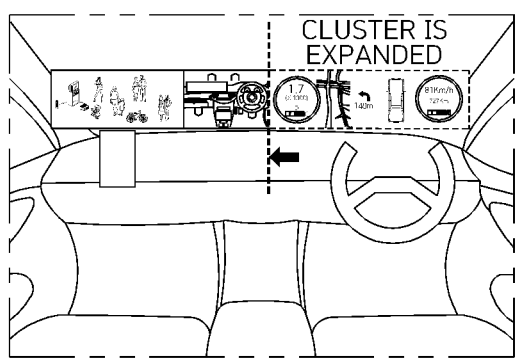

FIGS. 4A and 4B illustrate movement and expansion of the left and right areas of the display according to the embodiment of the present invention.

According to the embodiment of the present invention, in a manual driving situation, the content of the information displayed in the display region and a size of the display region are automatically changed according to the mounting position of the portable terminal.

In this case, user setting may be performed for priority for each information display.

Referring to FIG. 4A, when a portable terminal H is attached to the steering wheel near the driver's seat, the cluster information is displayed in the first region A1, the navigation information is displayed in the second region A2, and media information is displayed in the third region A3. When a position of the portable terminal H is moved from left to right, the first region A1 is expanded according to the position information of the portable terminal H.

In this case, the expansion of the first region A1 is limited to a virtual center line among an entire display region because visibility may be degraded when the cluster information (driving-related information) is displayed beyond the virtual center line.

As shown in FIG. 4B, since the portable terminal H located at the passenger seat is moved from right to left, a cluster region is expanded.

Figure 5:
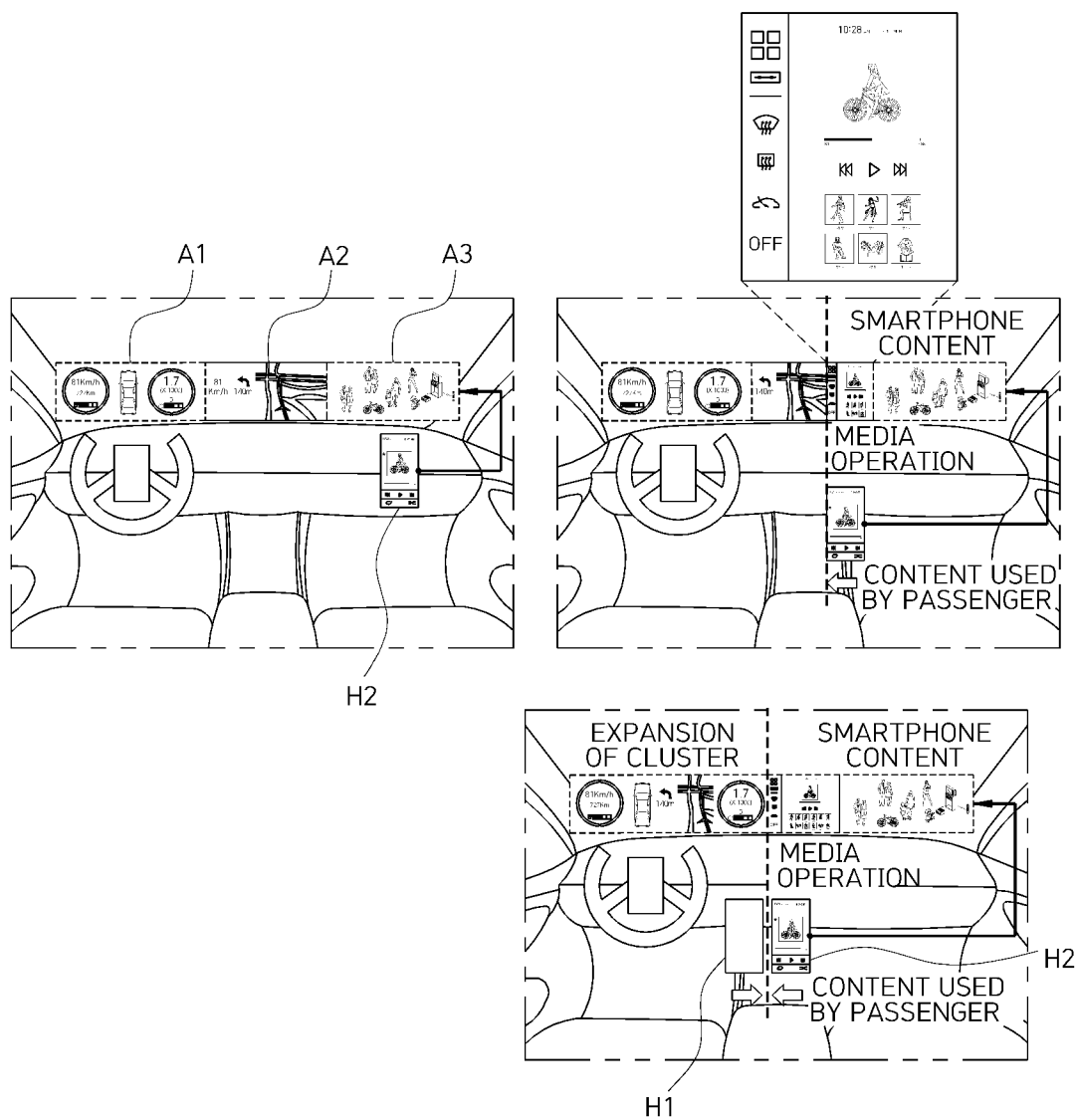
FIG. 5 illustrates movement and expansion of the left and right areas of the display according to the embodiment of the present invention according to addition of a portable terminal of a passenger.

FIG. 5 illustrates movement and expansion of the left and right areas of the display according to the embodiment of the present invention according to addition of a portable terminal of a passenger.

Since a portable terminal H2 of the passenger is added, smartphone content linked to the portable terminal H2 of the passenger is displayed in the passenger side region (the third area A3) among the display region.

In this case, a media operation screen and a smartphone content display screen are displayed in the passenger side region A3.

Depending on the positions of the portable terminal H1 of the driver and the portable terminal H2 of the passenger 2, the corresponding display regions may be expanded from left to right and from right to left, and the expansion is limited with respect to the virtual center line among the entire display region.

FIGS. 6A to 6C, 7A, 7B, 8A, and 8B illustrate movement and expansion of the vertical area of the display according to the embodiment of the present invention.

Figure 6A:
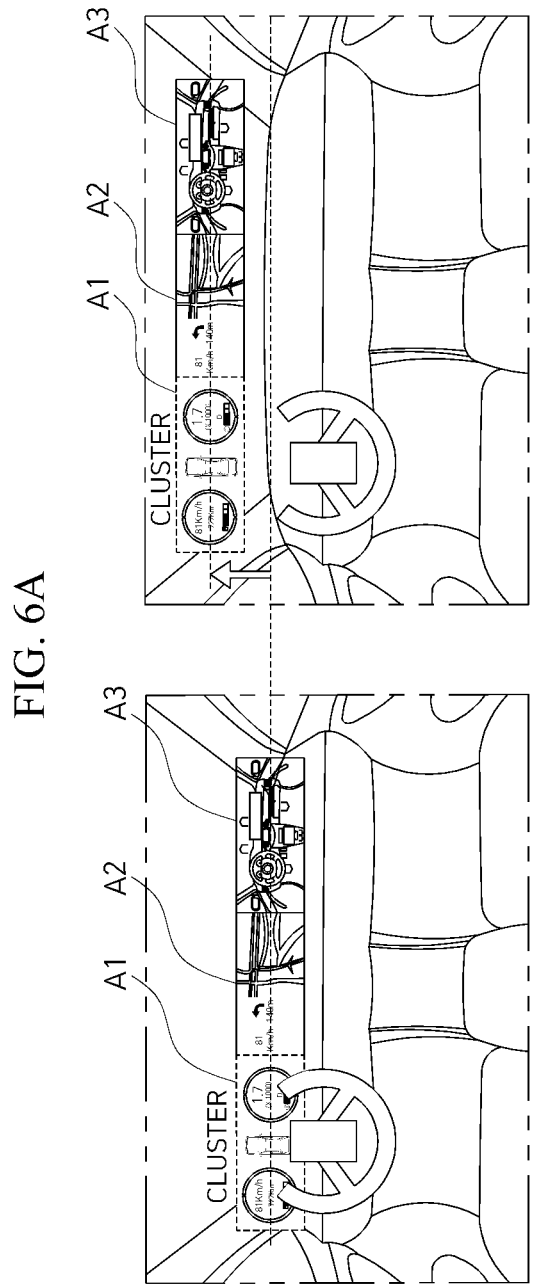
FIGS. 6A to 6C, 7A, 7B, 8A, and 8B illustrate movement and expansion of the vertical area of the display according to the embodiment of the present invention.
Figure 6B:
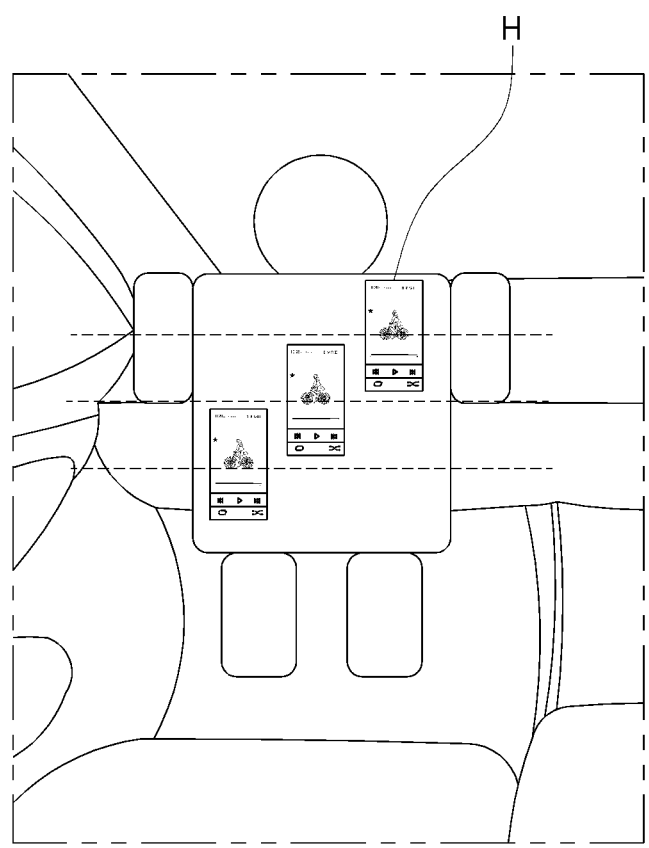
Figure 6C:
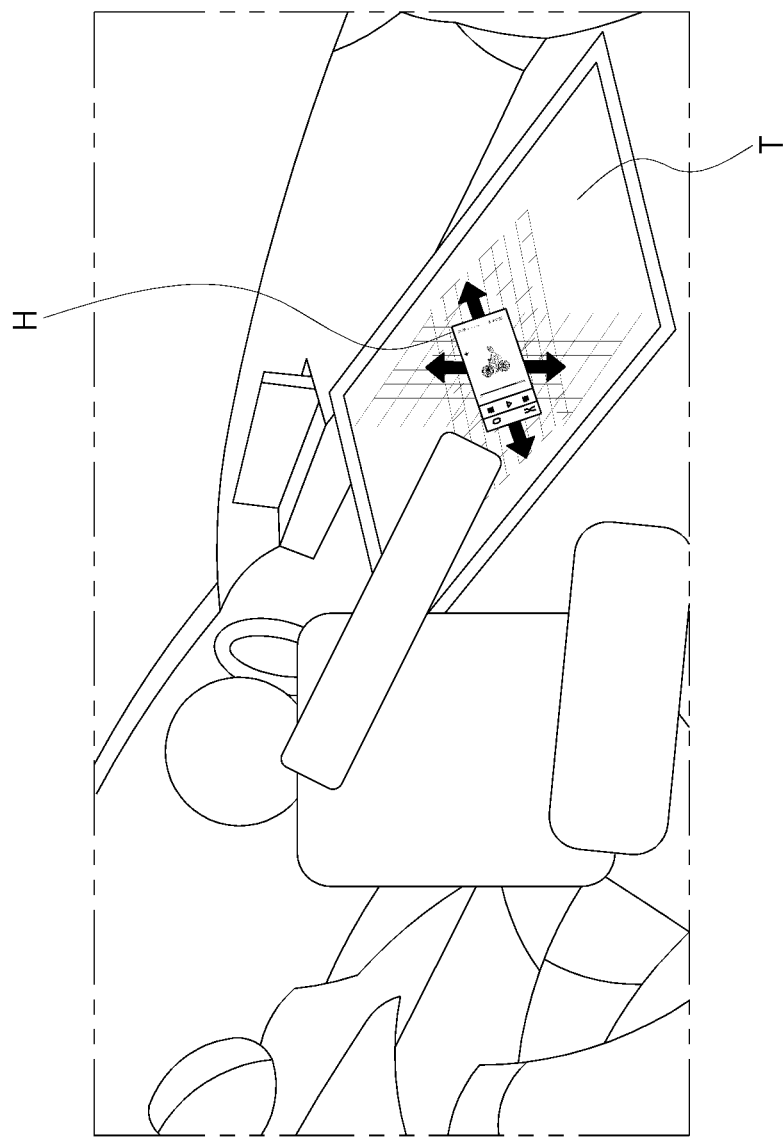

Referring to FIGS. 6A to 6C, positions of the display regions A1, A2, and A3 are adjusted according to positional movement of the portable terminal H.

Referring to FIG. 6B, the positions of the display regions A1, A2, and A3 where content is displayed are adjusted in a vertical direction according to the positional movement of the portable terminal in a user's vertical direction (z-axis).

Referring to FIG. 6C, the positions of the display regions A1, A2, and A3 where content is displayed are adjusted according to a position change of the portable terminal H which is moved in all directions on a table T.

Figure 7A:
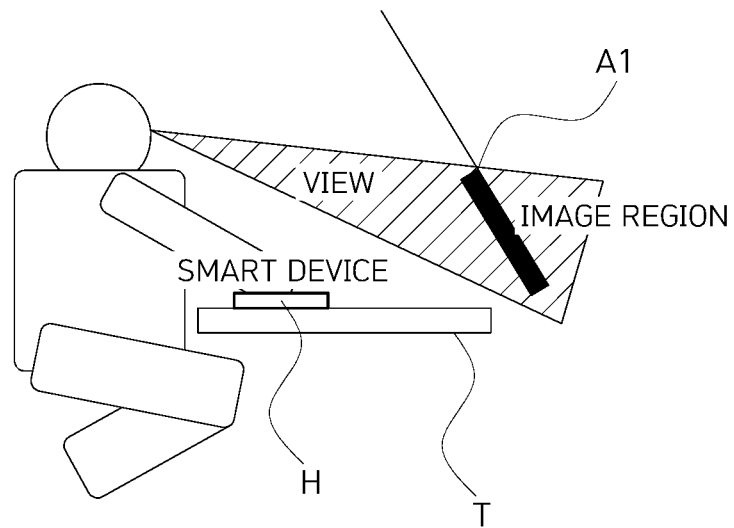

Referring to FIG. 7A, content is displayed on a windshield or in an image region A1 of the entire display region according to the position of the portable terminal H at a first position on the table T.

Figure 7B:
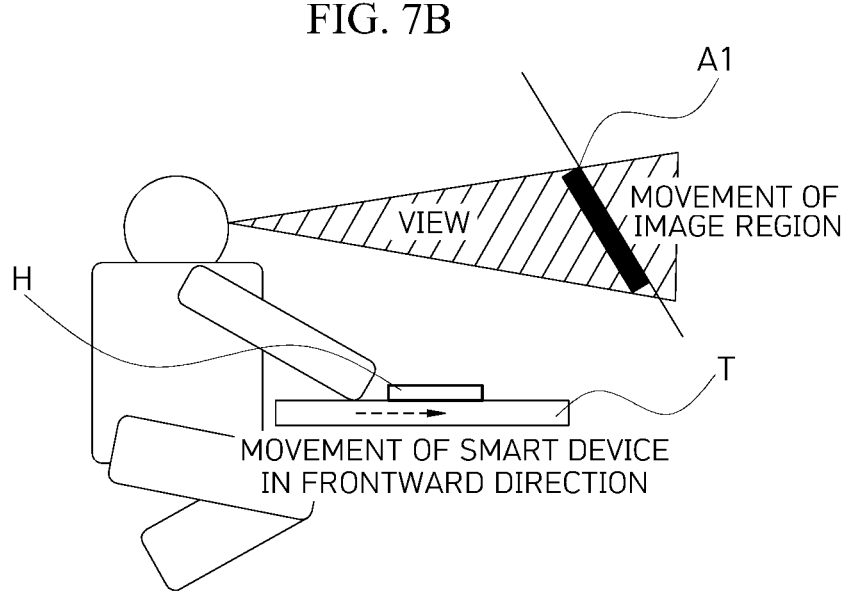

Referring to FIG. 7B, as the position of the portable terminal H is moved forward to a second position on the table T, the image region A1 is moved in an upward direction, and content is displayed in the moved image region A1.

Figure 8A:
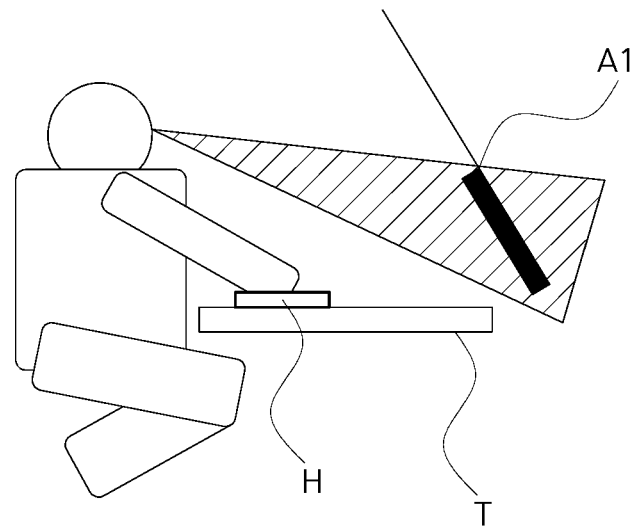

Referring to FIG. 8A, content is displayed on the windshield or in the image region A1 of the entire display region according to the position of the portable terminal H at the first position on the table T.

Figure 8B:
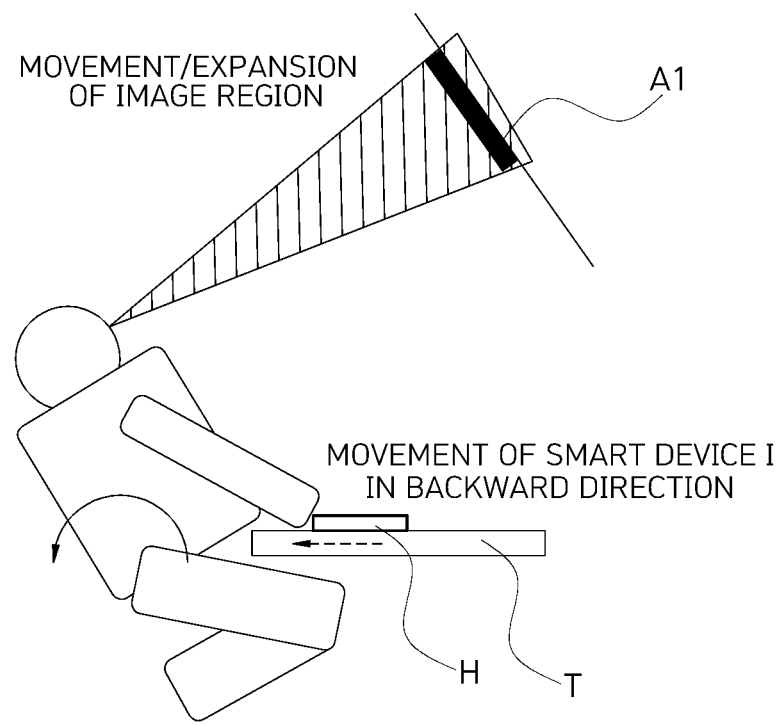

Referring to FIG. 8B, as the position of the portable terminal H is moved backward on the table T to the second position by a change of a sitting posture for relaxation (reclining rearward and backward movement of the seat), the image region A1 is moved in the upward direction, and content is displayed in the moved image region A1.

The above is an example of display control in consideration of a case in which a hand reach to the table and the portable terminal on the table becomes farther during reclining and a case in which the user's field of view rises upward, and as a distance from the user's eyes to the display region increases, the image region A1 may be expanded while being moved in the upward direction.

FIGS. 9A to 9D, 10A, and 10B illustrate movement and expansion of the left and right areas of a display in a purpose-built vehicle (PBV) according to the embodiment of the present invention;

Content desired by the user is displayed on an inner display of the PBV or a futuristic vehicle type in conjunction with a position of a user's portable terminal.

Figure 9A:
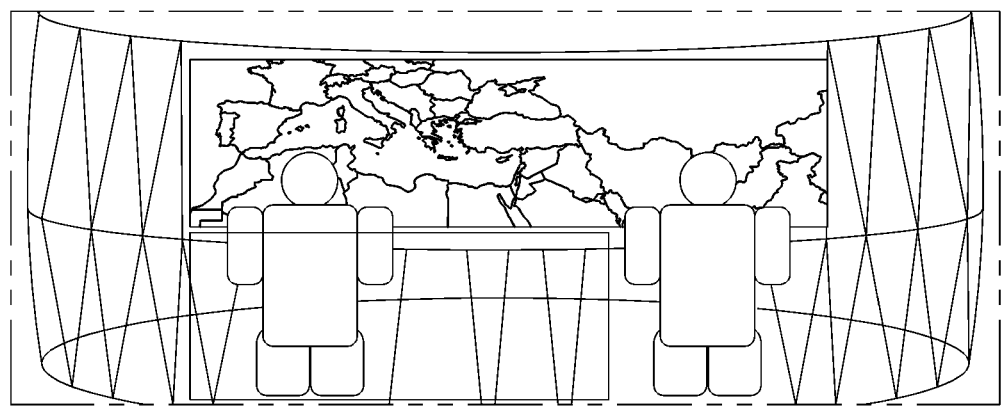
FIGS. 9A to 9D, 10A, and 10B illustrate movement and expansion of the left and right areas of a display in a purpose-built vehicle (PBV) according to the embodiment of the present invention.

Referring to FIG. 9A, it is assumed that two passengers are riding in the PBV.

Figure 9B:
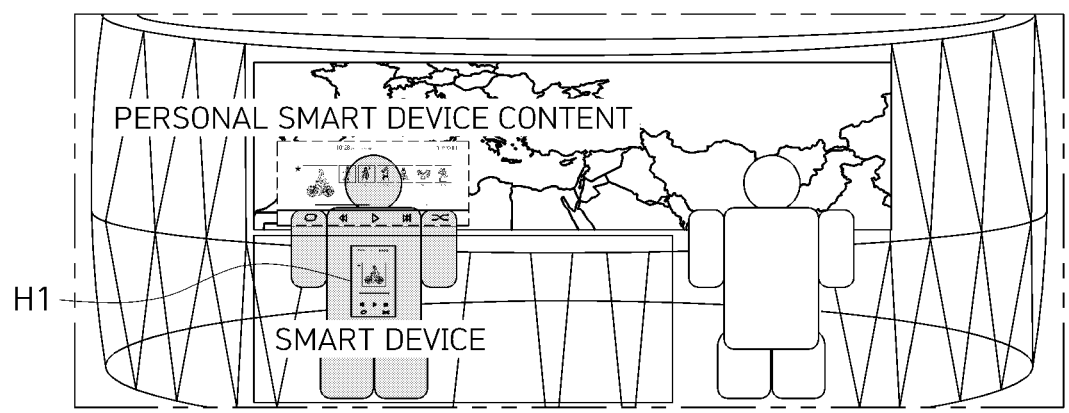

Referring to FIG. 9B, in conjunction with a portable terminal H1 of a first passenger, personal content of the first passenger is displayed on a partial region of the inner display.

Figure 9C:
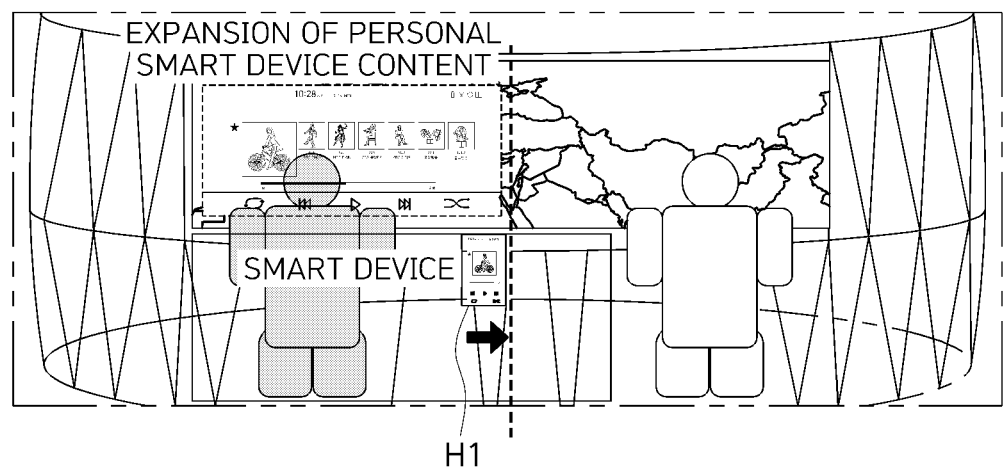

Referring to FIG. 9C, the first passenger may move a position of the portable terminal H1 to expand a region, where the personal content is displayed, among the inner display.

Figure 9D:
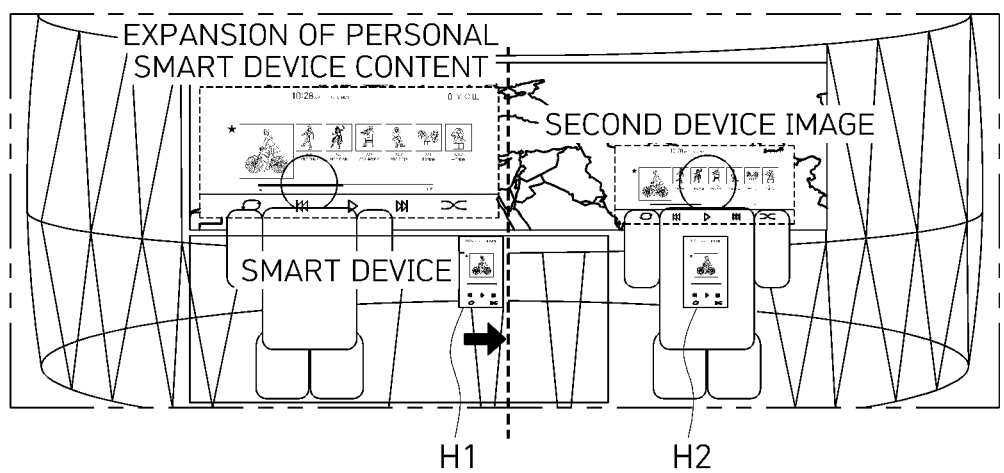

Referring to FIG. 9D, a second passenger uses a partial region of the inner display in the PBV as a personal content display region thereof using a portable terminal H2 thereof.

Figure 10A:
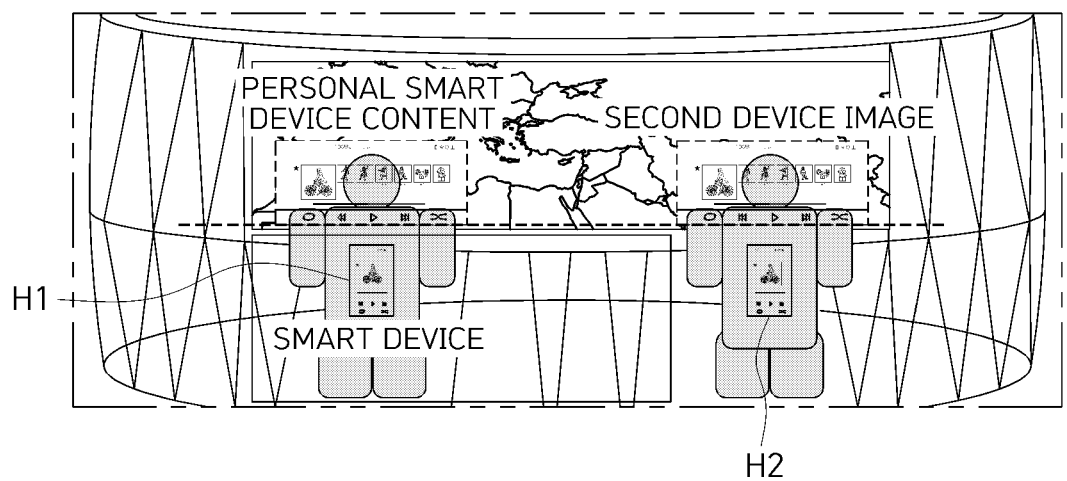
Figure 10B:
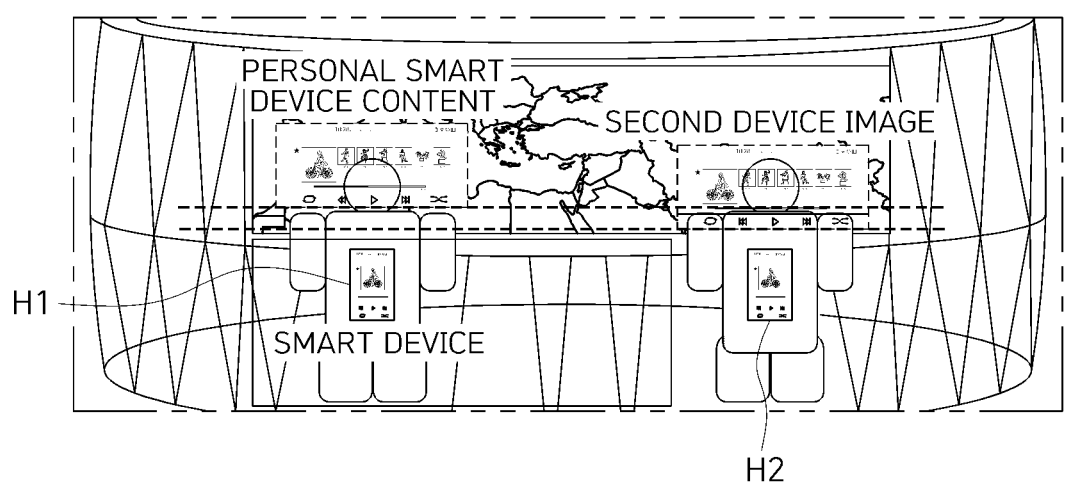

Referring to FIGS. 10A and 10B, the region where the personal content of the first passenger is displayed is moved as shown in FIG. 10B according to positional movement of the portable terminal H1 of the first passenger as shown in FIG. 10A.

As described above, this is because the position and size of the personal content display region are changed according to a change of position information of the portable terminal H1.

For example, as the first passenger reclines the seat of the first passenger through a reclining function, a hand reach to the table disposed at the seat of the first passenger becomes farther, and the portable terminal H1 of the first passenger moves backward on the table, and accordingly, a personal content region of the first passenger moves upward, and a size of the personal content region increases, and a size change is performed according to a change in a distance from eyes of the first passenger to the inner display.

Figure 11A:
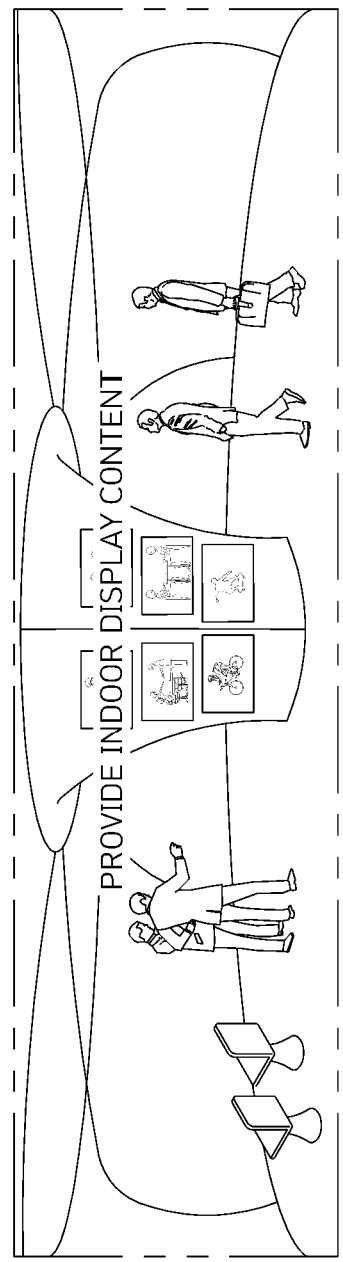
FIGS. 11A to 11C illustrate an indoor display in a HUB according to the embodiment of the present invention.
Figure 11B:
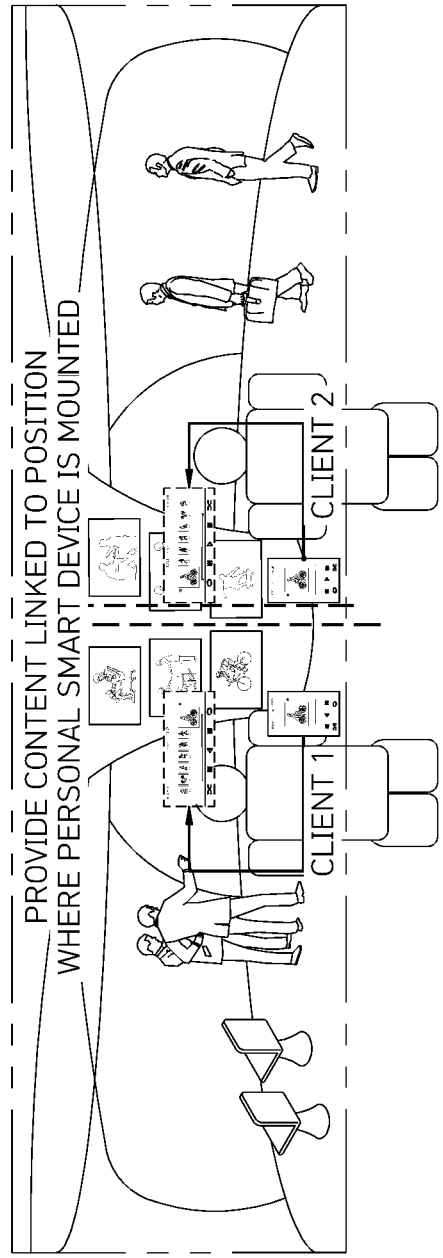
Figure 11C:
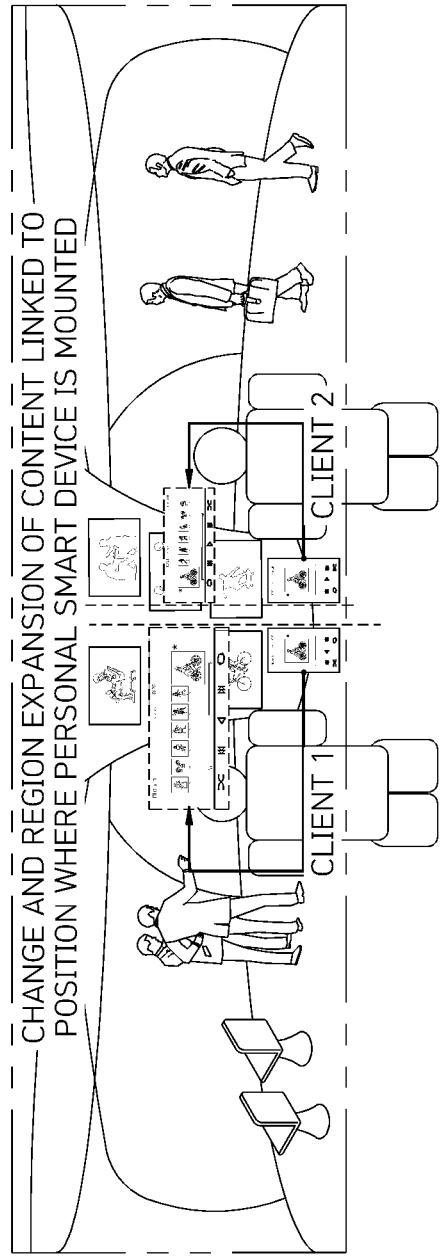

FIGS. 11A to 11C illustrate an indoor display in a HUB according to the embodiment of the present invention.

Referring to FIG. 11A, an indoor display is provided in the HUB, which is a base for interworking of urban air mobility (UAM) and the PBV.

Referring to FIG. 11B, as each customer adjusts the mounting position of a smart device thereof, it is possible to view personal content using the inner display.

Also, referring to FIG. 11C, the personal content display region is moved and expanded according to positional movement of the smart device.

Figure 12A:
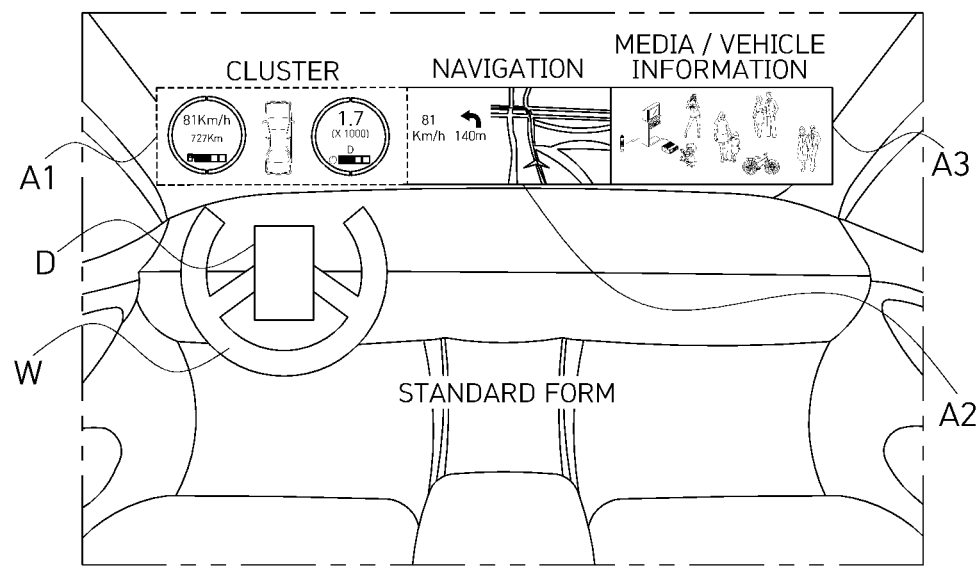
FIGS. 12A to 12C illustrate a change in a position of display information according to positions of the steering wheel and the portable terminal in a manual driving situation according to the embodiment of the present invention.
Figure 12B:
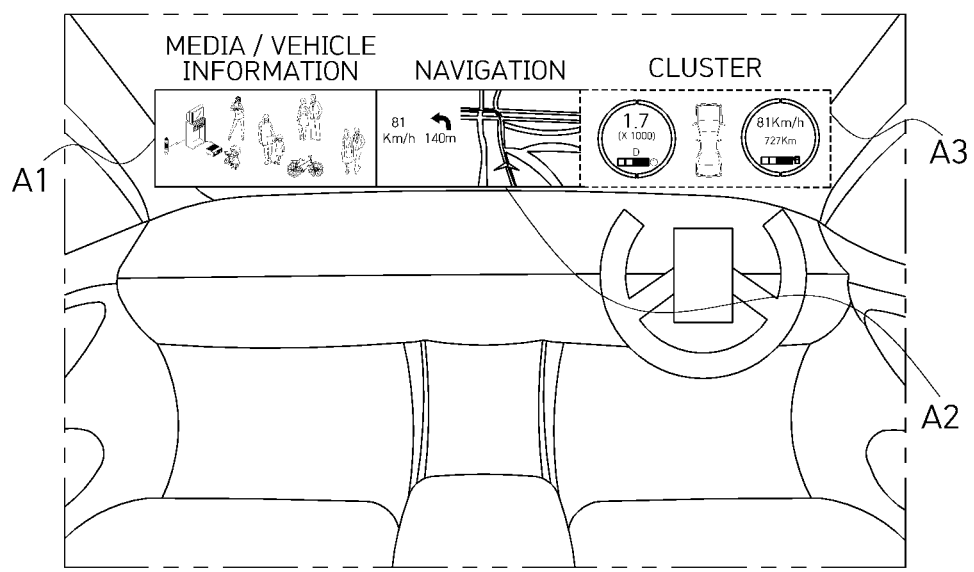
Figure 12C:
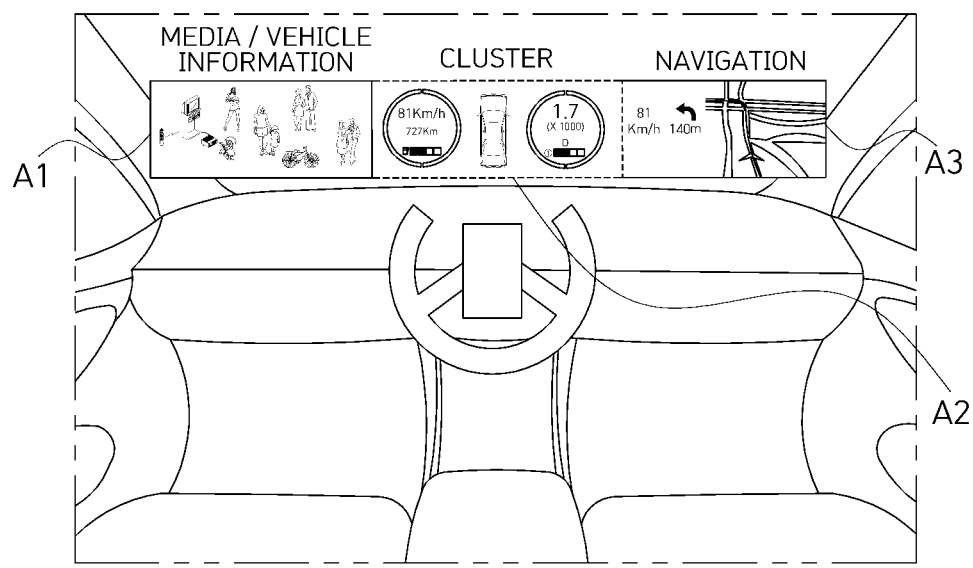

FIGS. 12A to 12C illustrate a change in a position of display information according to positions of the steering wheel and the portable terminal in a manual driving situation according to the embodiment of the present invention.

Referring to FIGS. 12A to 12C, the portable terminal D is mounted on the steering wheel W, and the front display is partitioned into the first region A1, the second region A2, and the third region A3.

For example, in FIG. 12A, as the steering wheel W and the portable terminal D are located at the driver's seat, the first region A1 of the front display region displays the cluster information, the second region A2 displays the navigation information, and the third region A3 displays media/vehicle information.

As shown in FIG. 12B, as the steering wheel W and the portable terminal D are moved to the passenger seat side, the third region A3 displays the cluster information, the first region A1 displays media information, and the second region A2 displays the navigation information.

As shown in FIG. 12C, as the steering wheel W and the portable terminal D are moved to the center region, the second region A2 displays the cluster information, the first region A1 displays the media information, and the third region A3 displays the navigation information.

Figure 13A:
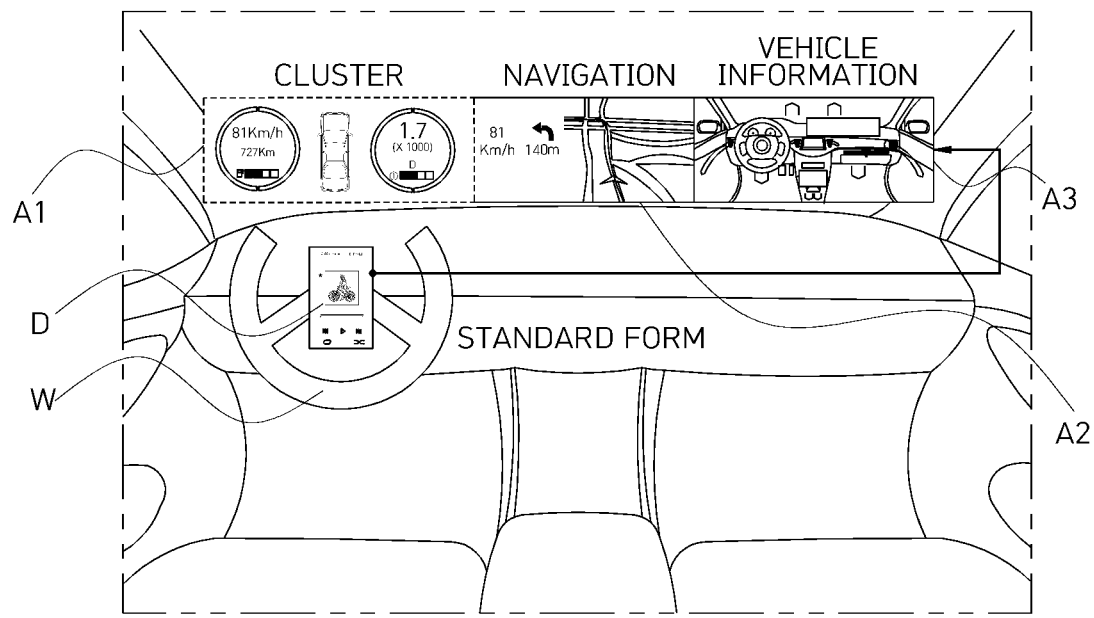
FIGS. 13A to 13D illustrate a change in a position of display information according to the position of the portable terminal in the manual driving situation according to the embodiment of the present invention.
Figure 13B:
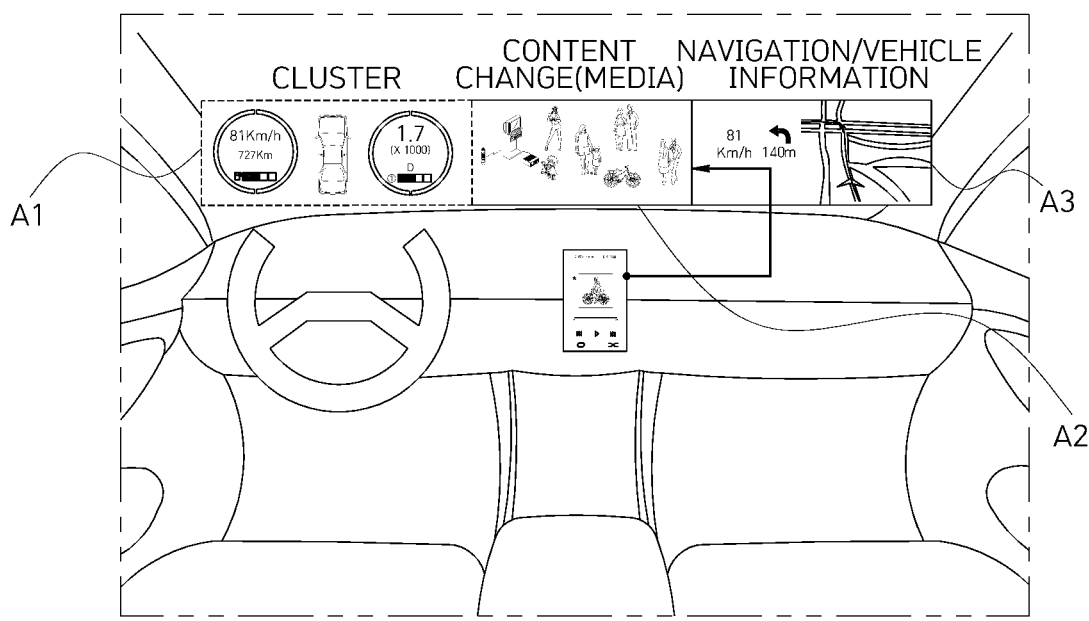
Figure 13C:
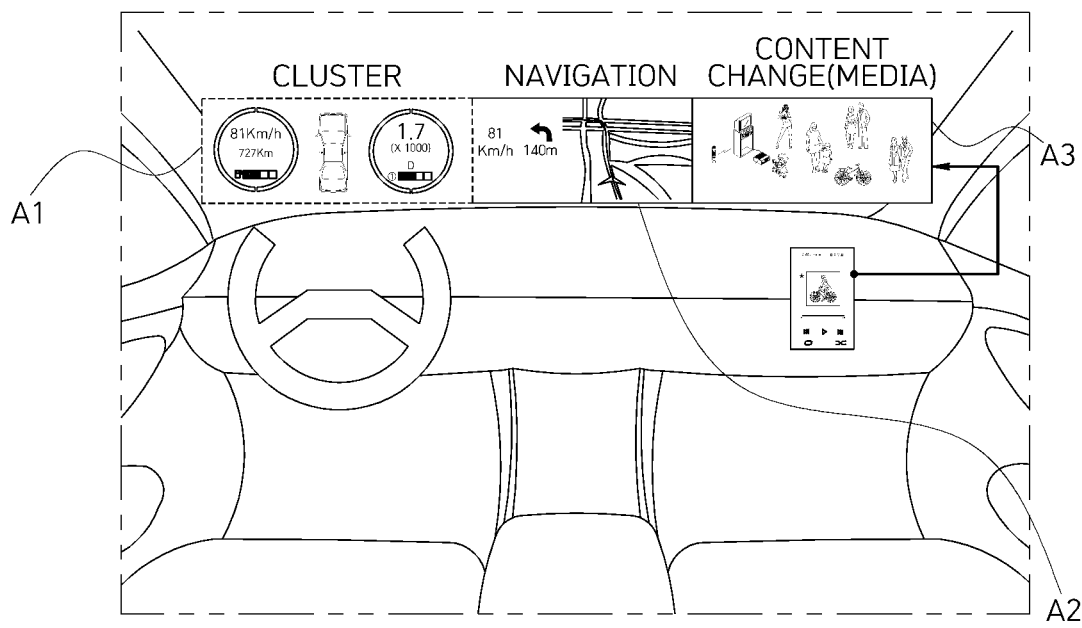

FIGS. 13A to 13C illustrate a change in a position of display information according to the position of the portable terminal in the manual driving situation according to the embodiment of the present invention.

Referring to FIGS. 13A to 13C, the portable terminal D is mounted on the steering wheel W, and the front display is partitioned into the first region A1, the second region A2, and the third region A3.

For example, in FIG. 13A, as the steering wheel W and the portable terminal D are located at the driver's seat, the first region A1 of the front display region displays the cluster information, the second region A2 displays the navigation information, and the third region A3 displays vehicle information.

As shown in FIG. 13B, as the portable terminal D is separated from the steering wheel W and is moved to a center fascia region, the third region A3 displays the navigation information, and the second region A2 displays the media information.

As shown in FIG. 13C, as the portable terminal D is moved to a passenger seat region, the second region A2 displays the navigation information, and the third region A3 displays the media information.

Figure 13D:
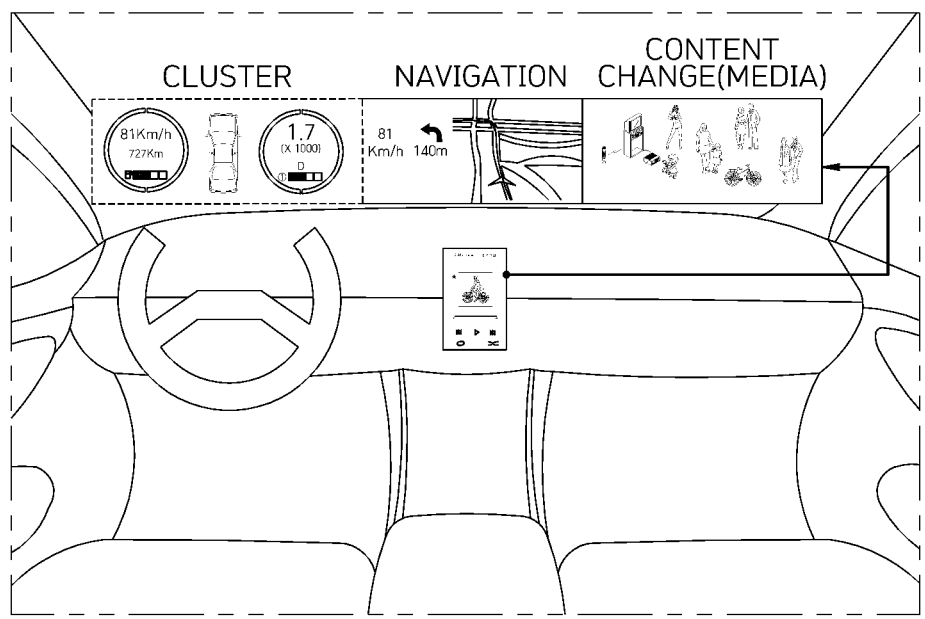

Referring to FIG. 13D, in the case in which the second region A2 among the display region is fixed as a navigation information display region, when the portable terminal D is moved to the center fascia region, the second region A2 maintains display of the navigation information, and the media information is displayed in the third region A3.

Figure 14A:
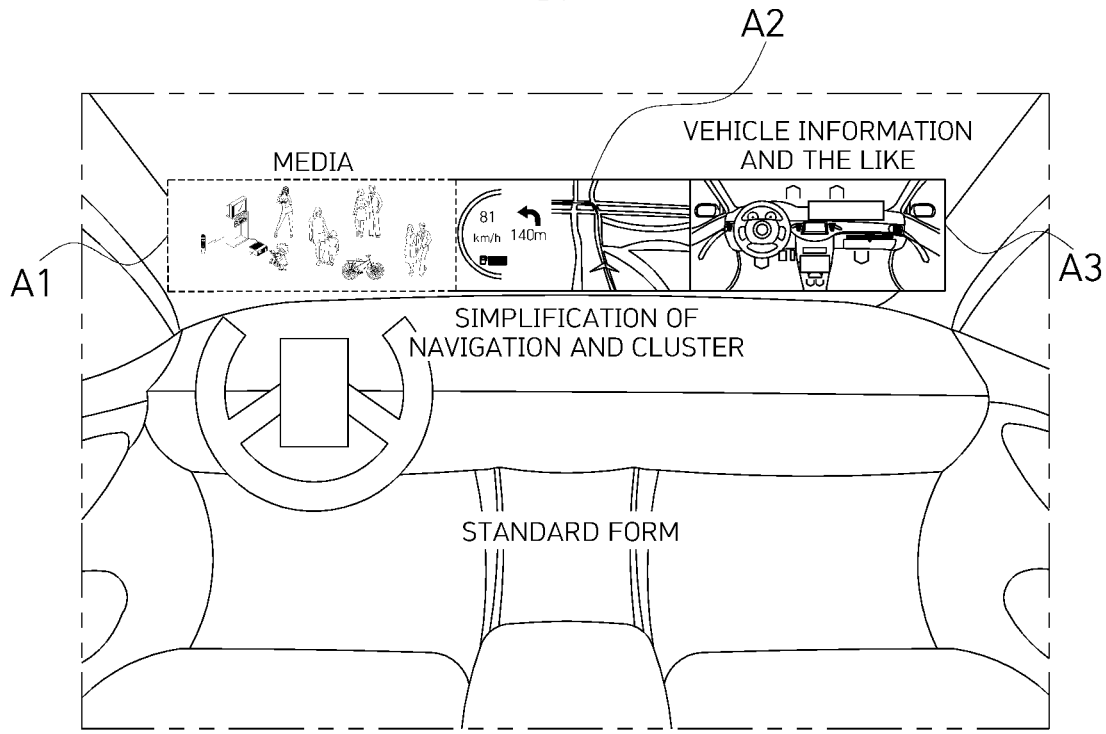
FIGS. 14A to 14C illustrate a change in a position of display information according to positions of the steering wheel and the portable terminal in an autonomous driving situation according to the embodiment of the present invention.
Figure 14B:
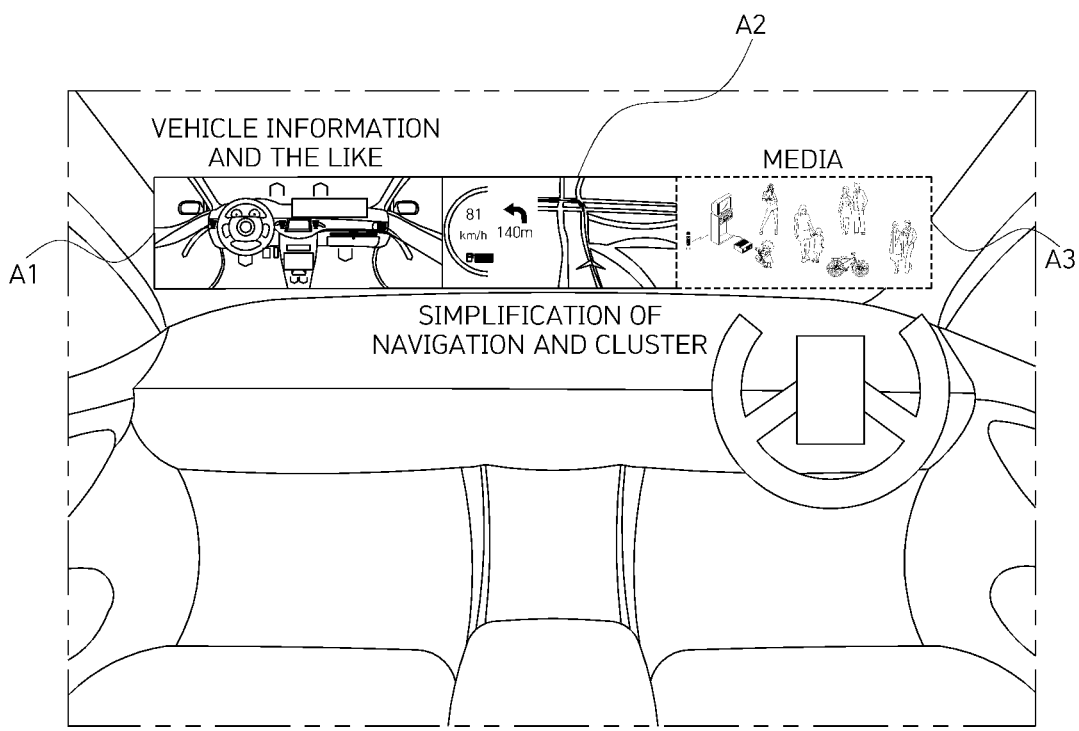
Figure 14C:
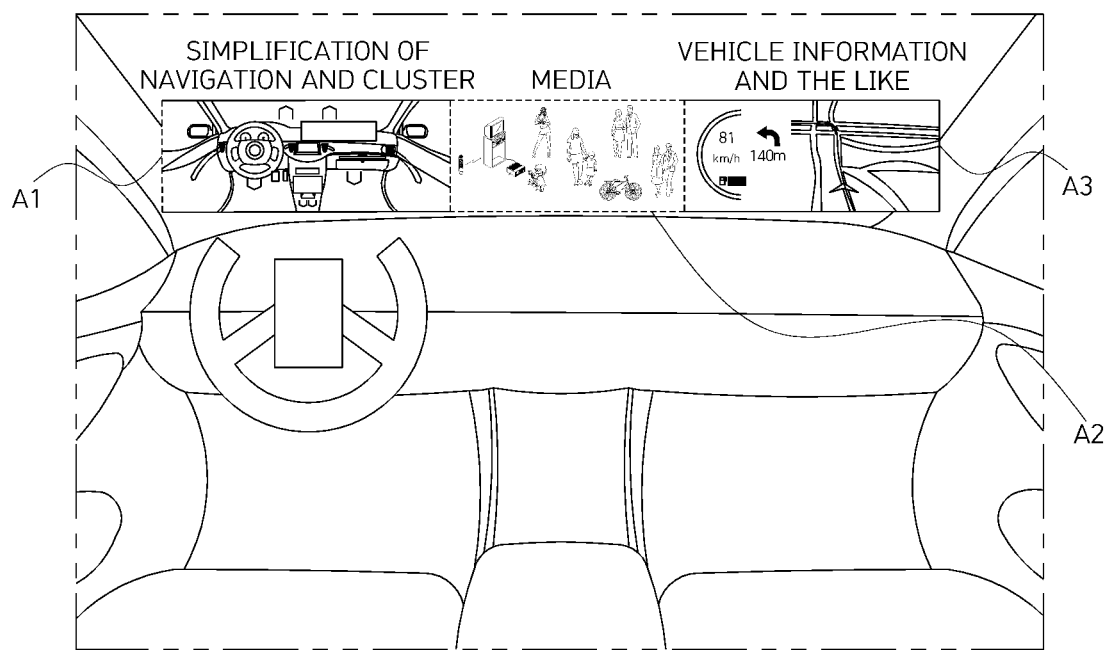

FIGS. 14A to 14C illustrate a change in a position of display information according to positions of the steering wheel and the portable terminal in an autonomous driving situation according to the embodiment of the present invention.

For example, in FIG. 14A, as the steering wheel W and the portable terminal D are located at the driver's seat, the first region A1 of the front display region displays the media information, the second region A2 displays the navigation information, and the third region A3 displays the vehicle information.

As shown in FIG. 14B, as the steering wheel W and the portable terminal D are moved to the passenger seat side, the third region A3 displays the media information, the first region A1 displays the vehicle information, and the second region A2 displays the navigation information.

As shown in FIG. 14C, as the steering wheel W and the portable terminal D are moved to the center region, the second region A2 displays the media information, the first region A1 displays the vehicle information, and the third region A3 displays the navigation information.

Figure 15A:
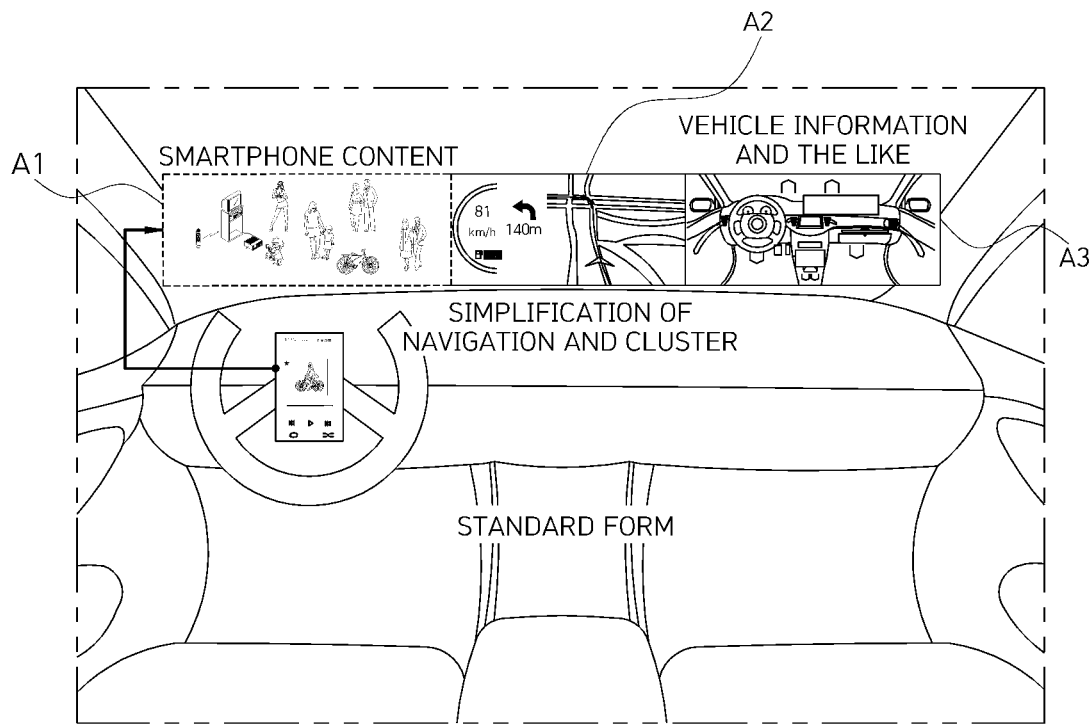
FIGS. 15A to 15C illustrate a change in a position of display information according to the position of the portable terminal in the autonomous driving situation according to the embodiment of the present invention.
Figure 15B:
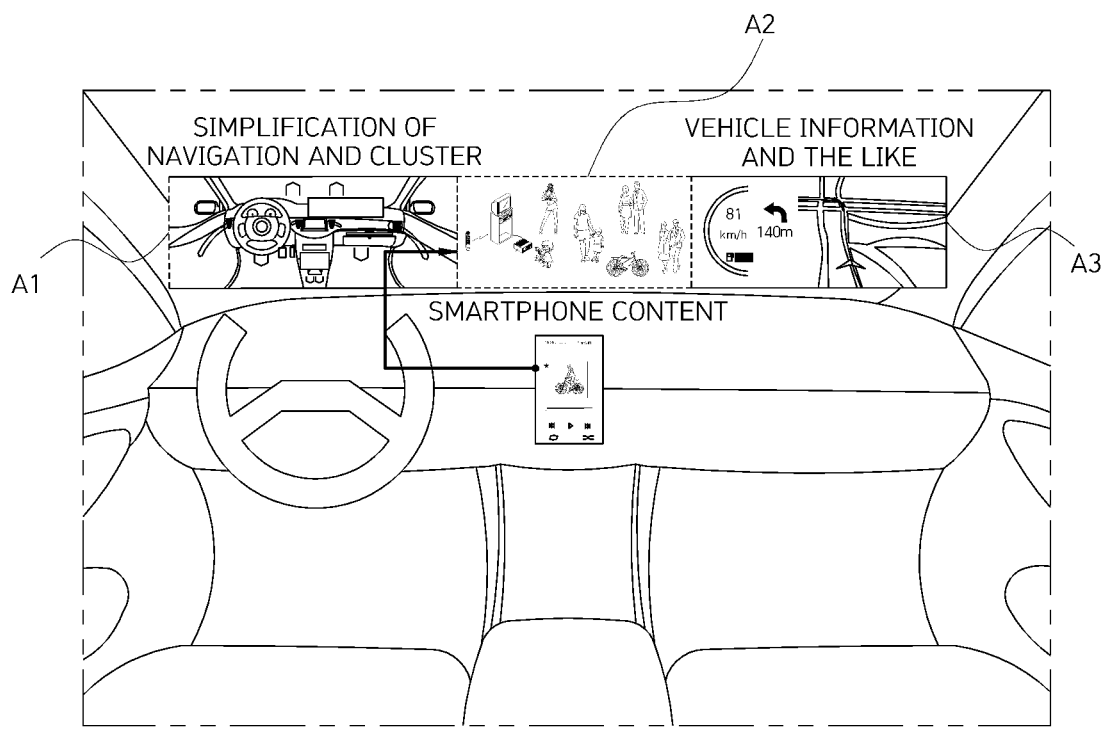
Figure 15C:
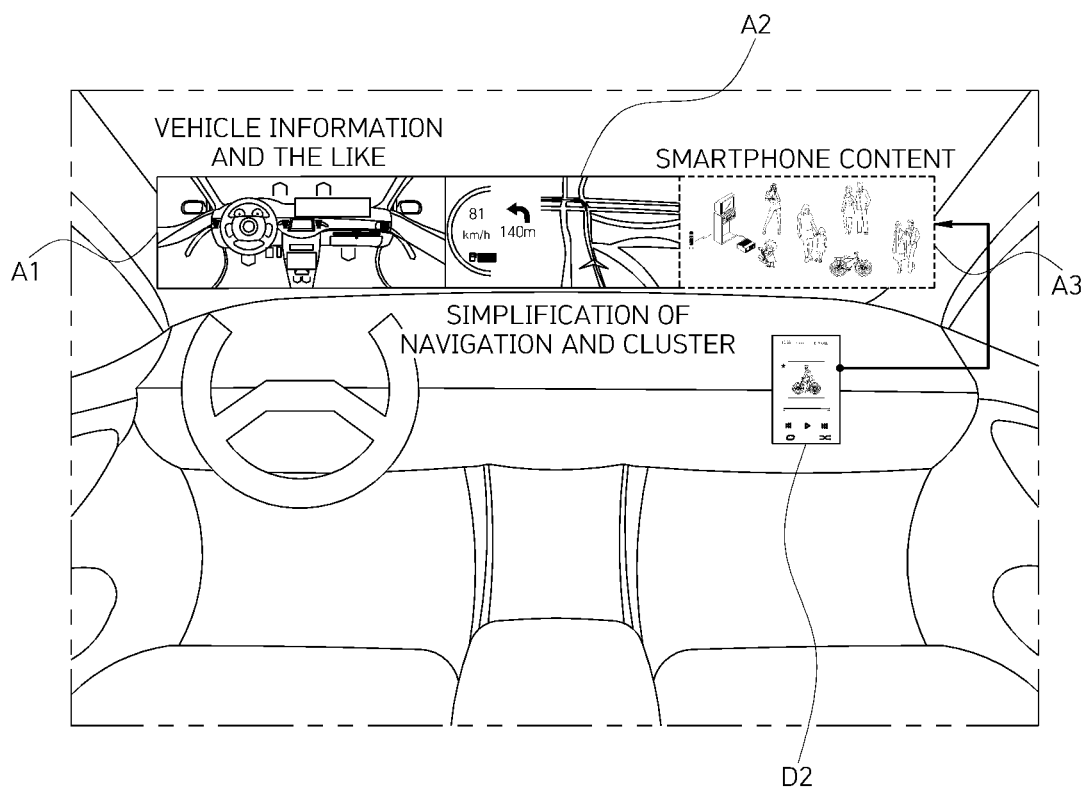

FIGS. 15A to 15C illustrate a change in a position of display information according to the position of the portable terminal in the autonomous driving situation according to the embodiment of the present invention.

Referring to FIGS. 15A to 15C, content mirroring for scanning is performed with respect to the position of the portable terminal.

In FIG. 15A, as the steering wheel W and the portable terminal D are located at the driver's seat, the first region A1 of the front display region displays the content information, the second region A2 displays the navigation information and the cluster information, and the third region A3 displays the vehicle information.

As shown in FIG. 15B, as the portable terminal D is separated from the steering wheel W and is moved to the center fascia region, the second region A2 displays the content information, the first region displays the vehicle information, and the third region A3 displays the navigation information and the cluster information.

As shown in FIG. 15C, as the portable terminal D is moved to a passenger seat region, the content information is displayed in the third region A3, the vehicle information is displayed in the first region A1, and the navigation information and the cluster information are displayed in the second region A2.

Figure 16A:
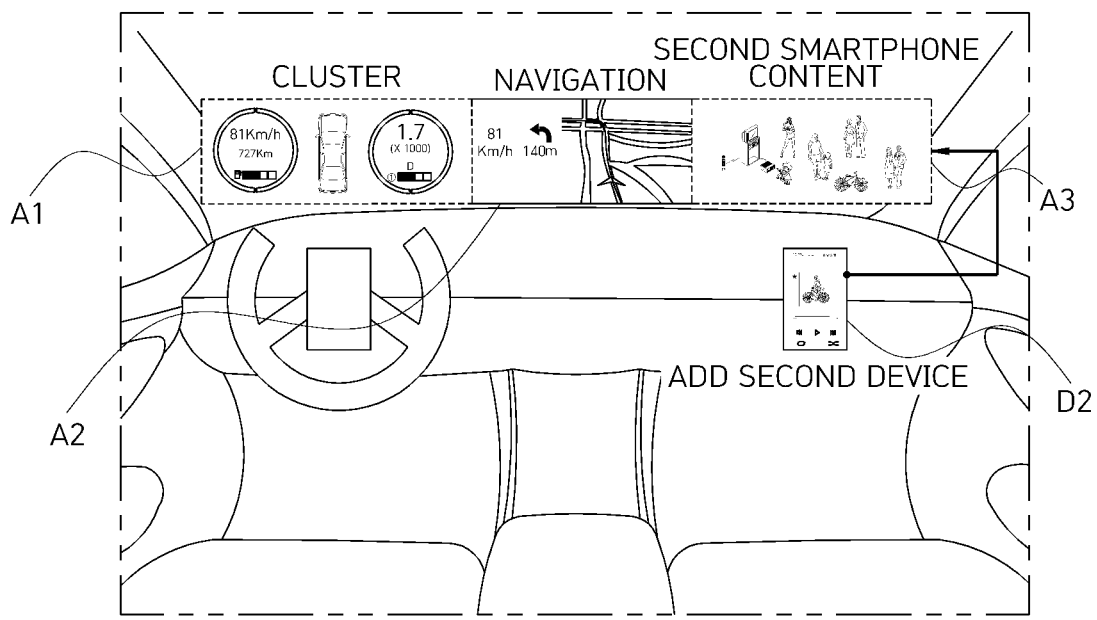
FIGS. 16A, 16B, and 17 illustrate display control according to the portable terminal of the passenger according to the embodiment of the present invention.
Figure 16B:
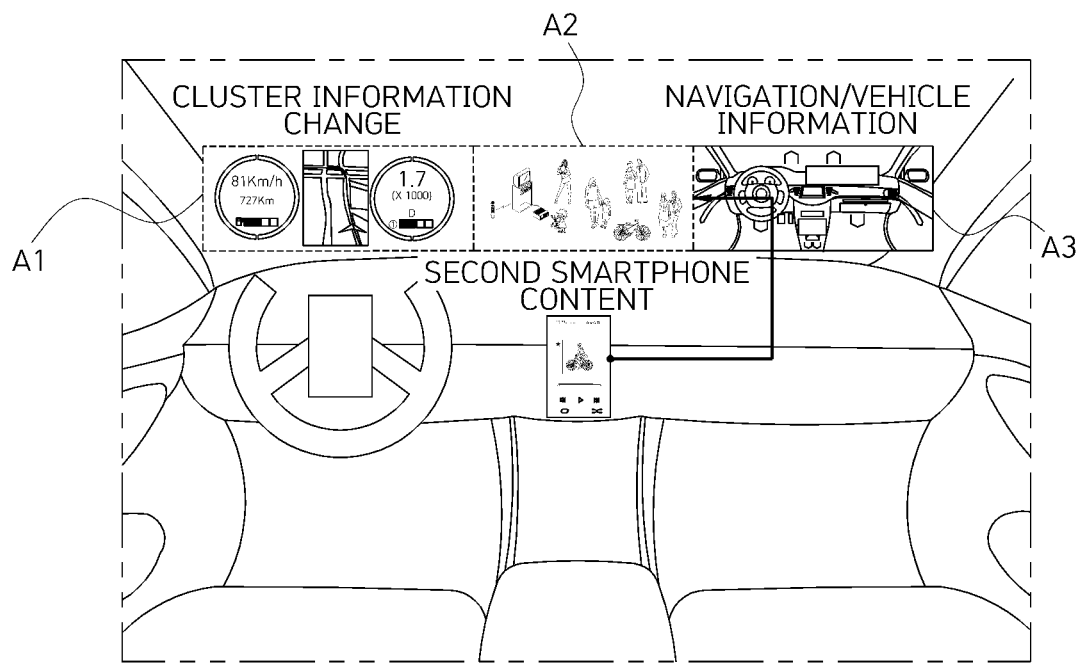
Figure 17:
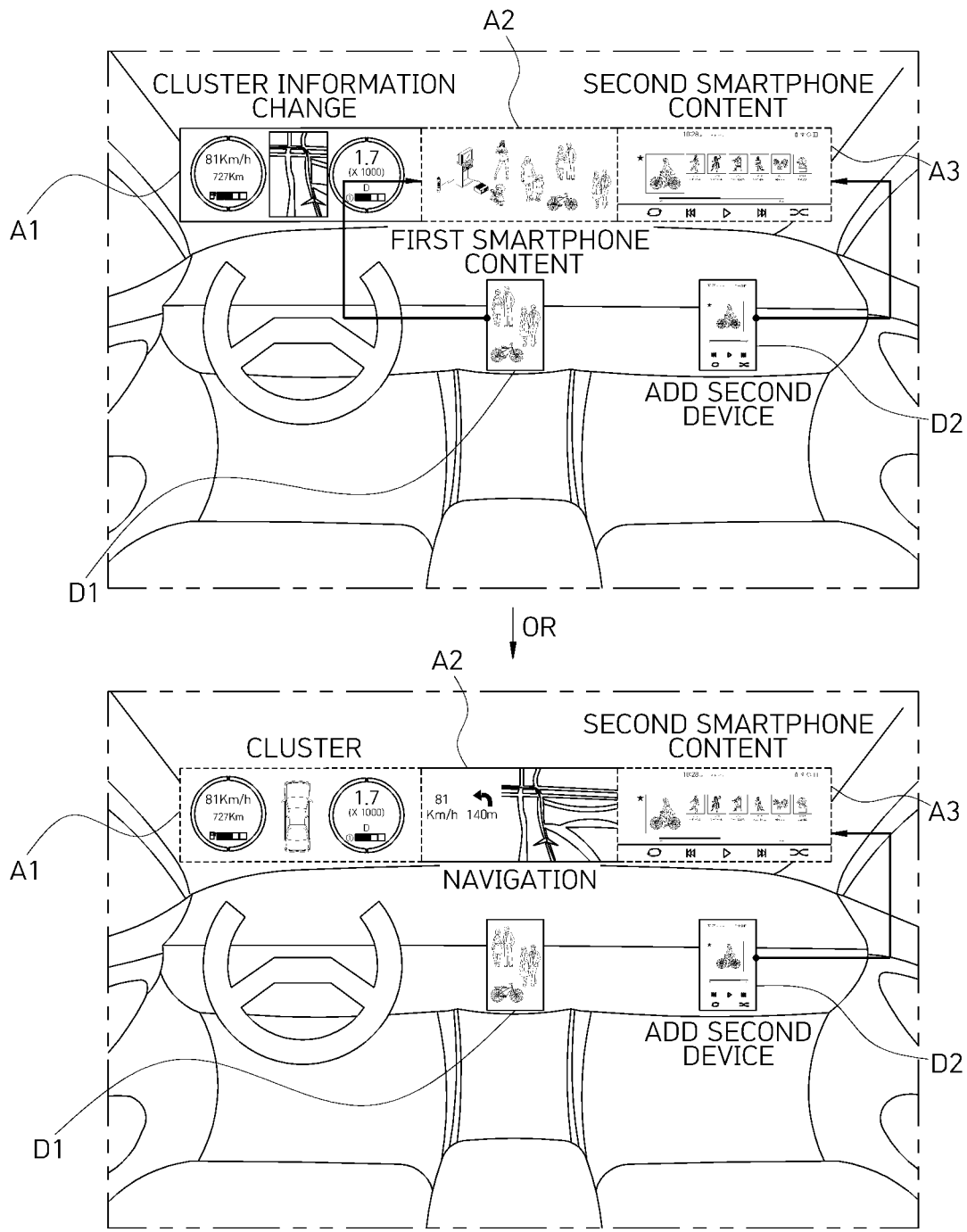

FIGS. 16A, 16B, and 17 illustrate display control according to the portable terminal of the passenger according to the embodiment of the present invention.

Referring to FIG. 16A, as a portable terminal D2 of the passenger is added, the content information is displayed in the third region A3 in conjunction with the portable terminal of the passenger.

Referring to FIG. 16B, as the portable terminal D2 of the passenger is moved from the passenger seat to the center fascia region, the content information linked to the portable terminal D2 of the passenger is displayed in the second region A2.

Referring to FIG. 17, as the portable terminal D1 of the driver is moved from the driver's seat to the center fascia region, the first region A1 changes from displaying only the cluster information to displaying the cluster information and the navigation information, and, the content information linked to the portable terminal D1 of the driver is displayed in the second region A2, and the content information linked to the portable terminal D2 of the passenger is displayed in the third region A3.

Referring to FIG. 17, when the navigation information is fixed to be displayed in the second region A2, the navigation information is continuously displayed in the second region A2 even when the position of the portable terminal D1 of the driver moves, and the content information linked to the portable terminal D2 of the passenger is displayed in the third region A3.

Figure 18:
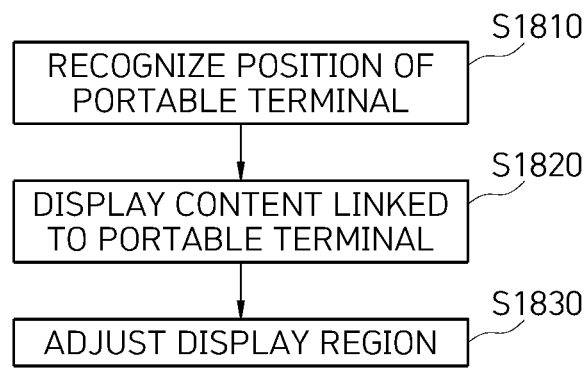
FIG. 18 illustrates a method of controlling the display according to an embodiment of the present invention.

FIG. 18 illustrates a method of controlling a display according to an embodiment of the present invention.

The method of controlling the display according to the embodiment of the present invention includes receiving position information of an in-vehicle device (S1810), controlling a display position according to the position information of the in-vehicle device (S1820), and adjusting a display position of information displayed on the display in the vehicle according to a monitoring result of the position of the in-vehicle device (S1830).

In operation S1820, a display position where cluster information is displayed is controlled according to the positional movement of a steering wheel and a portable terminal mounted on the steering wheel.

In operation S1820, a display position where content information is displayed in conjunction with the portable terminal is controlled according to the positional movement of the portable terminal.

In operation S1830, in the case in which a display region where navigation information is displayed is fixed, the display position of the content information is adjusted to a region other than the display region where the navigation information is displayed when the position of the portable terminal is moved to the position corresponding to the display region where the navigation information is displayed.

In operation S1830, the display position of the content information displayed in conjunction with the portable terminal is adjusted according to the positional movement of the steering wheel and the portable terminal mounted on the steering wheel during autonomous driving.

An apparatus for controlling a display according to another embodiment of the present invention includes an input part which receives position information of an in-vehicle device, a memory in which a program which controls an in-vehicle display according to the position information is stored, and a processor which executes the program, and the processor selects a type of the information displayed on the display in the vehicle and adjusts a display region of the displayed information according to the position information.

The input part receives the position information of at least one of a steering wheel and a portable terminal as position information of the in-vehicle device.

When a position of the in-vehicle device changes, the processor expands the display region to correspond to the position of the in-vehicle device.

The processor controls expansion of the display region with respect to a preset limit line among the entire display region.

The processor receives content from a portable terminal owned by a passenger and displays the received content in conjunction with the portable terminal owned by the passenger.

The processor moves a position of the display region according to positional movement of the in-vehicle device.

The processor moves the display region in an upward direction when the position of the in-vehicle device is moved in a backward direction with respect to a driving direction.

The processor expands the display region in consideration of a distance from eyes.

A method of controlling the display according to another embodiment of the present invention includes (a) recognizing a position information of an in-vehicle device, (b) displaying content in conjunction with the in-vehicle device according to the position of the in-vehicle device, and (c) adjusting a region where the content is displayed according to a monitoring result of the position of the in-vehicle device.

In operation (a), position information of at least one of a steering wheel and a portable terminal is recognized as the position of the in-vehicle device.

In operation (c), the region where the content is displayed is expanded according to the monitoring result of the position of the in-vehicle device.

In operation (c), expansion of the region where the content is displayed is controlled with respect to a preset limit line among the entire display region.

In operation (c), the region where the content is displayed is moved in an upward direction when the position of the in-vehicle device is moved in a backward direction with respect to a driving direction.

In operation (c), the region where the content is displayed is expanded in consideration of a distance from eyes.

Meanwhile, the method of controlling the display according to the embodiment of the present invention may be realized in a computer system or recorded in a recording medium. The computer system may include at least one processor, a memory, a user input apparatus, a data communication bus, a user output apparatus, and a storage. Each of the above-described components performs data communication through the data communication bus.

The computer system may further include a network interface coupled to a network. The processor may be a central processing unit (CPU) or a semiconductor device which processes instructions stored in a memory and/or a storage.

The memory and the storage may include various types of volatile or non-volatile storage media. For example, the memory may include a read only memory (ROM) and a random-access memory (RAM).

Accordingly, the method of controlling the display according to the embodiment of the present invention may be realized as a computer-executable method. When the method of controlling the display according to the embodiment of the present invention is executed in a computer device, computer readable instructions may perform the method of controlling the display according to the present invention.

Meanwhile, the above-described method of controlling the display according to the present invention may be realized as computer-readable code on a computer-readable recording medium. The computer-readable recording medium includes any type of recording medium in which data which may be read by the computer system is stored. For example, the computer-readable recording medium may include a read only memory (ROM), a random-access memory (RAM), a magnetic tape, a magnetic disk, a flash memory, an optical data storage device, and the like. Further, the computer-readable recording medium may be distributed in the computer system connected through a computer communication network, and may be stored and executed as readable code in a distribution manner.

According to the present invention, there is an effect in that a position of a smart device or a steering wheel in a vehicle can be recognized to control display information and the position and size of a display region according to the corresponding positions.

There is an effect of controlling display information and a display region respectively provided to a driver and a passenger.

There is an effect that necessary information which should be provided to a driver first according to a driving situation can be extracted and provided.

Effects of the present invention are not limited to the above-mentioned effects, and other effects which are not mentioned may be apparently understood by those skilled in the art from below.

What is claimed is:

1. An apparatus for controlling a display, comprising:
   a sensor configured to determine a position, within a vehicle, of a portable terminal;
   a memory configured to store a program that controls the display according to the position of the portable terminal; and
   a processor configured to arrange information displayed on the display in the vehicle according to the position of the portable terminal within the vehicle,
   wherein the processor is further configured to adjust a position where cluster information is displayed according to positional movement of a steering wheel and the portable terminal being mounted on the steering wheel.

2. The apparatus of claim 1, wherein the information displayed on the display comprises content information displayed in conjunction with the portable terminal, and
   wherein the processor is further configured to adjust a position of the content information on the display according to positional movement of the portable terminal.

3. The apparatus of claim 2, wherein the processor is further configured to set the position of the content information in a region other than a display region where navigation information is displayed when the portable terminal is moved to a position corresponding to the display region where the navigation information is displayed, if the display region where the navigation information is displayed is fixed.

4. The apparatus of claim 1, wherein the information displayed on the display comprises content information displayed in conjunction with the portable terminal mounted on the steering wheel, and
   wherein the processor is further configured to adjust a position of the content information on the display according to positional movement of the steering wheel and the portable terminal during autonomous driving.

5. A method of controlling a display, comprising:
   determining a position, within a vehicle, of a portable terminal;
   controlling a position of information displayed on the display in the vehicle according to the position of the portable terminal; and
   adjusting the position of the information displayed on the display, according to a result of monitoring the position of the portable terminal within the vehicle, wherein
   the controlling the position of the information displayed on the display comprises controlling a position where cluster information is displayed, according to positional movement of a steering wheel and the portable terminal being mounted on the steering wheel.

6. The method of claim 5, wherein the controlling the position of the information displayed on the display comprises controlling a position of content information displayed in conjunction with the portable terminal, according to positional movement of the portable terminal.

7. The method of claim 6, wherein the adjusting the position of the information displayed on the display comprises adjusting the position of the content information to a region other than a display region where navigation information is displayed, in response to the position of the portable terminal being moved to a position corresponding to the display region where the navigation information is displayed, in a case in which the display region where the navigation information is displayed is fixed.

8. The method of claim 5, wherein the adjusting the position of the information displayed on the display comprises adjusting a display position of content information displayed in conjunction with the portable terminal being mounted on the steering wheel, according to positional movement of the steering wheel and the portable terminal during autonomous driving.

9. A non-transitory, computer-readable storage medium storing instructions that, when executed by a processor, cause the processor to perform the method of claim 5.

* * * * *